United States Patent
Yassour et al.

(10) Patent No.: US 11,128,627 B2
(45) Date of Patent: Sep. 21, 2021

(54) TRIGGERING AND CONTROLLING WORKFLOWS ACROSS APPLICATIONS AND SERVICES USED IN CLOUD COMPUTING SYSTEMS

(71) Applicant: Microsoft Technology Licensing, LLC, Redmond, WA (US)

(72) Inventors: Yoav Yassour, Zikhron Yaakov (IL); Adi Regev, Hod Hasharon (IL); Boaz Chen, Moledet (IL); Itay Demri, Petah Tikva (IL); Ella Lesser, Hasharon (IL); Khalid Awwad, Jerusalem (IL); Shahar Prish, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 609 days.

(21) Appl. No.: 15/919,906

(22) Filed: Mar. 13, 2018

(65) Prior Publication Data

US 2019/0289010 A1 Sep. 19, 2019

(51) Int. Cl.
*H04L 29/06* (2006.01)
*H04L 29/08* (2006.01)
*G06K 7/10* (2006.01)
*G06K 7/14* (2006.01)

(52) U.S. Cl.
CPC ........ *H04L 63/101* (2013.01); *G06K 7/10366* (2013.01); *G06K 7/1417* (2013.01); *H04L 67/10* (2013.01)

(58) Field of Classification Search
CPC ............ G06F 21/34; G06F 2221/2141; G06K 7/1366; G06K 7/1417
See application file for complete search history.

(56) References Cited

U.S. PATENT DOCUMENTS

| 2003/0217264 A1* | 11/2003 | Martin | G06F 21/6209 713/156 |
| 2009/0077217 A1* | 3/2009 | McFarland | G06Q 10/06 709/223 |
| 2013/0205373 A1* | 8/2013 | Jaudon | H04W 4/06 726/4 |

OTHER PUBLICATIONS

Bertino et al., A Flexible Model Supporting the Specification and Enforcement of Role-based Authorization in Workflow Management Systems, ACM, 1997.*
Iyer, Microsoft Flow—Automate your repetitive tasks and business processes effortlessly, softweb solutions, 2016.*
Perez, Microsoft Flow, a tool for managing workflows launches on iOS, Jun. 2016.*
Regev, Flow creation now available from your mobile phones, Microsoft, 2016.*
Oldham, Demystifying Microsoft Flow, Dec. 2017.*

(Continued)

*Primary Examiner* — Minh Dinh
(74) *Attorney, Agent, or Firm* — Workman Nydegger

(57) ABSTRACT

Various aspects of triggering and controlling workflows are disclosed, where a workflow processes data across a plurality of services by performing a predefined operation using predefined parameters when triggered by a predefined input. Specifically, the various aspects include providing access control for workflows triggered using button sharing, encoding workflows and scanning encoded workflows to trigger workflows, using security badges and access control systems used at workplaces to trigger workflows, and enabling workflows to extract information from mobile devices and using the information for subsequent processing.

18 Claims, 10 Drawing Sheets

(56) References Cited

OTHER PUBLICATIONS

Pradeep, "Microsoft Flow now allows you to share your Button Flows with others", Retrieved From https://mspoweruser.com/microsoft-flow-now-allows-you-to-share-your-button-flows-with-others, Mar. 15, 2017, 5 Pages.

Herbert, et al., "Share button flows in Microsoft Flow", Retrieved From https://docs.microsoft.com/en-us/flow/share-buttons, Sep. 21, 2017, 11 Pages.

Regev, Adi, "Connecting Flow to the real world—Flows can now be triggered directly from physical buttons", Retrieved From https://flow.microsoft.com/en-us/blog/physical-buttons/, Apr. 4, 2017, 10 Pages.

Regev, Adi, "The power of buttons! You can now share your Button Flows and pin to your home screen", Retrieved From https://flow.microsoft.com/en-us/blog/button-sharing/, Mar. 15, 2017, 10 Pages.

Vaishnav, Sunay, "Manage connection access while sharing button flows to enable richer scenario", Retrieved From https://flow.microsoft.com/en-us/blog/advanced-button-sharing/, Jul. 27, 2017, 8 Pages.

\* cited by examiner

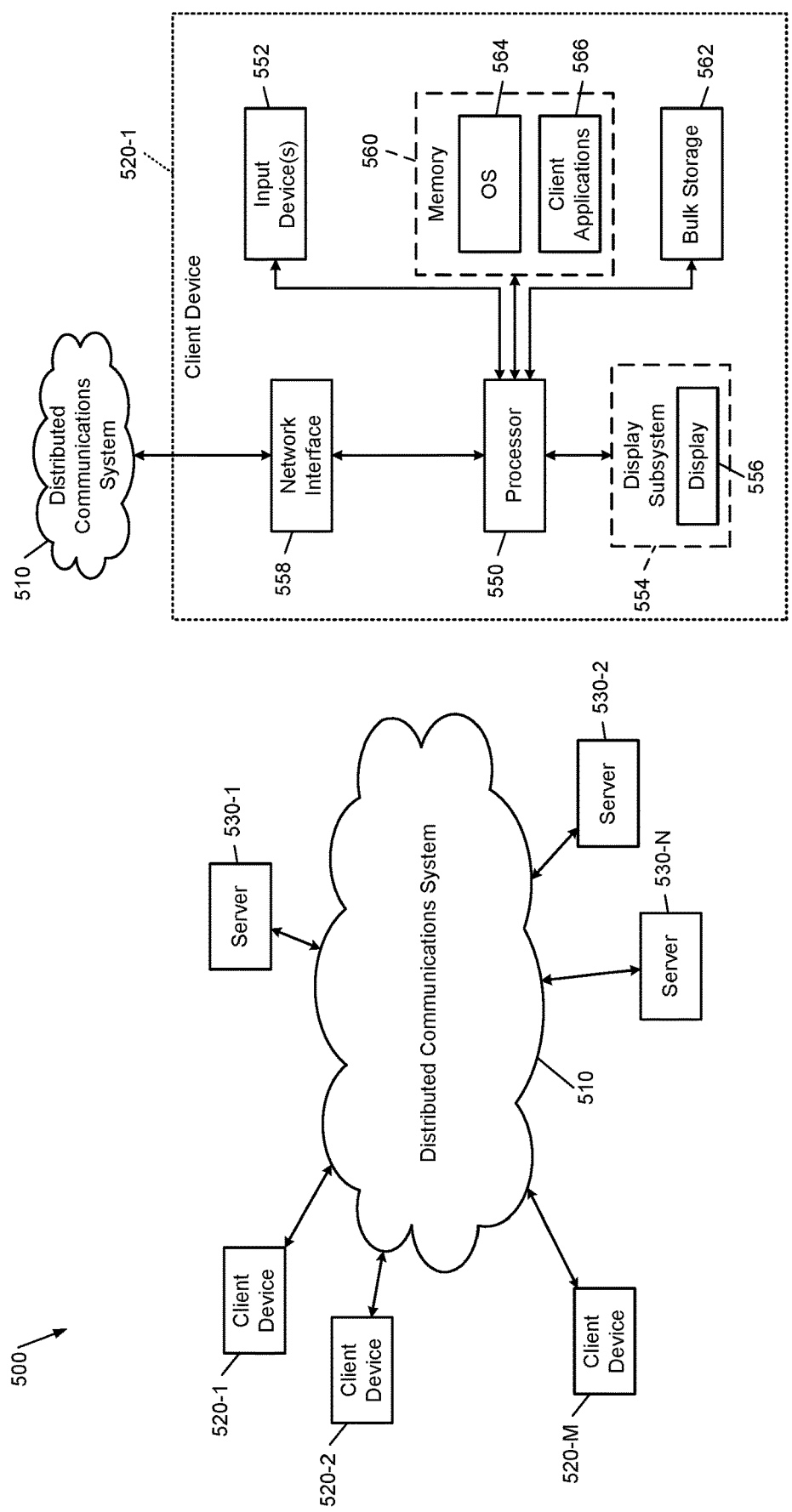

TRIGGERING AND CONTROLLING WORKFLOWS ACROSS APPLICATIONS AND SERVICES USED IN CLOUD COMPUTING SYSTEMS

FIELD

The present disclosure relates generally to cloud computing systems and more particularly to triggering and controlling workflows across applications and services used in cloud computing systems.

BACKGROUND

Nowadays, people often use multiple devices and applications for their computing needs. For example, people often use a desktop computer at work, a laptop computer at home or while traveling, and additionally, portable mobile devices such as smart phones and tablets. On these devices, people use various software applications for performing various tasks. With the proliferation of cloud computing, the data generated by these applications is often stored at various locations.

It can be helpful to provide a service that helps users in creating automated workflows between applications (apps) and services to synchronize files, get notifications, collect data, and so on. Such a service, which can be appropriately called a flow service, can automate workflows across a growing number of apps and services that business users rely on. Accordingly, a flow service can be defined as a cloud-based service that makes it practical and simple for line-of-business users to build workflows that automate time-consuming business tasks and processes across applications and services.

For example, a user may want to create a workflow between an email service and an application that can store and process documents attached to emails. To create the workflow, the user can log into the flow service. The flow service may offer templates for various tasks that people may routinely perform. One of the templates may match the user's requirement in this example, which is to extract attachments from emails and to store the attachments for processing by another service or application. If the user finds a suitable template in the flow service, the user may select the template to create the workflow to perform the intended task. Alternatively, the user can explicitly create the workflow without using a template to perform the intended task.

Either way, to establish the workflow, the user specifies the user's email service and the application that will process the attachments. The user provides the user's login credentials for both services. The user specifies triggers and actions to be performed when the workflow is triggered. Thus, a workflow between the user's email service and the user's specified application is established. Subsequently, whenever the user receives an email with an attachment, receiving the email with an attachment serves as a trigger to start the workflow. Once triggered, the workflow automatically extracts the attachment from the email and stores the attachment in the user's storage space specified in the workflow for further processing by the user's specified application. For example, the further processing by the user's specified application could include converting all attachments into a PDF format, organizing the PDF documents, notifying the user, etc.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system comprises a processor and a non-transitory computer-readable medium to store instructions for execution by the processor. The instructions are configured to generate a process to perform a predefined operation in response to receiving a predefined input. The process is configured to process data across a plurality of services by performing the predefined operation using predefined parameters when triggered by the predefined input. The instructions are configured to provision the process with an ability to designate one or more sources to provide the predefined input and to prevent the one or more sources from accessing the process for a purpose other than providing the predefined input. The instructions are configured to perform the predefined operation in response to receiving the predefined input from one of the designated sources. The ability to designate one or more sources to provide the predefined input and to prevent the one or more sources from accessing the process for a purpose other than providing the predefined input allows restricting the one or more sources from accessing resources associated with the process.

In other features, the one or more sources include mobile devices. The instructions are further configured to provision the mobile devices with a feature to send the predefined input. The feature is shared across the mobile devices.

In other features, the one or more sources include physical input devices with built in internet connectivity. The instructions are further configured to provision the physical input devices with a feature allowing the physical input devices to send the predefined input.

In other features, the one or more sources include mobile devices and physical input devices externally associated with the mobile devices. The instructions are configured to provision the mobile devices with a feature allowing the physical input devices to send the predefined input. The feature is shared across the mobile devices.

In other features, the one or more sources include a reader configured to read, and send as the predefined input, an encoded Uniform Resource Locator (URL) including the predefined parameters for the process. The instructions are further configured to decode the encoded URL, parse the decoded URL, and perform the predefined operation based on the parsing.

In other features, the one or more sources include a reader configured to read, and send as the predefined input, data from a card used with an access control system controlling access to premises, the data identifying a holder of the card. The instructions are further configured to perform the predefined operation on behalf of the holder based on the data.

In other features, the instructions are further configured to provision the process with abilities to add a source to provide the predefined input and to remove a source from the designated one or more sources.

In other features, the instructions are further configured to allow a modification of at least one of the predefined operation and the predefined parameters. The one or more sources do not control the modifications.

In other features, the ability to designate one or more sources includes an access control list.

In other features, the process is configured to communicate with the plurality of services, a first service of the plurality of services providing the predefined input, and a second service of the plurality of services performing the predefined operation.

In still other features, a system comprises a processor and a non-transitory computer-readable medium to store instructions for execution by the processor. The instructions are configured to set up a process configured to communicate with a plurality of services via proxies associated with Application Programming Interfaces of the plurality of services, and to process data across the plurality of services by performing a predefined operation using predefined parameters in response to receiving a predefined input. The instructions are configured to designate one or more sources to provide the predefined input to the process. The instructions are configured to perform the predefined operation by executing the process in response to receiving the predefined input from one of the designated sources. The instructions are configured to prevent the one or more sources from performing other operations associated with the process to restrict the one or more sources from accessing resources associated with the process.

In other features, the one or more sources include mobile devices. The instructions are further configured to provision the mobile devices with a feature to send the predefined input to the process. The feature is shared across the mobile devices.

In other features, the one or more sources include physical input devices. The instructions are further configured to provision the physical input devices with a feature allowing the physical input devices to send the predefined input to the process.

In other features, the one or more sources include mobile devices and physical input devices externally associated with the mobile devices. The instructions are configured to provision the mobile devices with a feature allowing the physical input devices to send the predefined input to the process via respective mobile devices. The feature is shared across the mobile devices.

In other features, the one or more sources include a reader configured to read, and send as the predefined input to the process, an encoded Uniform Resource Locator (URL) including the predefined parameters for the process. The instructions are further configured to decode the encoded URL, parse the decoded URL, and perform the predefined operation based on the parsing.

In other features, the one or more sources include a reader configured to read, and send as the predefined input to the process, data from a card used to access a facility via an access control system controlling access to facility, the data including an identity of an entity presenting the card to the reader. The instructions are further configured to perform the predefined operation on behalf of the entity by using the data.

In other features, the instructions are further configured to provision the process with an access control list to add a source to provide the predefined input and to remove a source from the designated one or more sources.

In other features, the instructions are further configured to modify at least one of the predefined operation and the predefined parameters and to not grant rights to the one or more sources to modify at least one of the predefined operation and the predefined parameters.

In still other features, a method comprises configuring a process to communicate with a plurality of services via proxies associated with Application Programming Interfaces of the plurality of services. The method further comprises configuring the process to receive a predefined input. The method further comprises configuring the process to perform a predefined operation in response to receiving the predefined input. The method further comprises configuring predefined parameters to input to the process in response to receiving the predefined input. The method further comprises configuring the process to process data across the plurality of services by performing the predefined operation using the predefined parameters in response to receiving the predefined input. The method further comprises configuring an access control list to designate one or more sources to provide the predefined input to the process using a feature shared across the one or more sources. The one or more sources include mobile devices, physical input devices configured to communicate with the process, or physical input devices external to and associated with the mobile devices. The method further comprises configuring the access control list to prevent the one or more sources from performing other operations associated with the process. The method further comprises executing the process using the predefined parameters in response to receiving the predefined input from one of the designated sources. The method further comprises performing the predefined operation in response to receiving the predefined input from one of the designated sources.

In other features, the one or more sources include a reader configured to read, and send as the predefined input to the process, an encoded Uniform Resource Locator (URL) including the predefined parameters for the process; and the method further comprises decoding the encoded URL, parsing the decoded URL, and performing the predefined operation based on the parsing. Alternatively, the one or more sources include a reader configured to read, and send as the predefined input to the process, data from a card used to access a facility via an access control system controlling access to facility, the data including an identity of an entity presenting the card to the reader; and the method further comprises performing the predefined operation on behalf of the entity by using the data.

In still other features, a system comprises a processor and a non-transitory computer-readable medium to store instructions for execution by the processor. The instructions are configured to receive a Uniform Resource Locator (URL) for a process, the process being executable based on a trigger. The instructions are configured to receive parameters to input to the process when the process is triggered. The instructions are configured to encode the URL and the parameters to generate a code capable of being scanned. The instructions are configured to output the code that when scanned and decoded causes the process to execute using the parameters.

In other features, the instructions are further configured to receive inputs to generate the URL for the process and to generate the URL for the process.

In other features, the instructions are further configured to receive inputs to create the process and to create the process.

In other features, the process is configured to process data across a plurality of services by performing a predefined operation using the parameters when executed based on the trigger.

In still other features, a system comprises a processor and a non-transitory computer-readable medium to store instructions for execution by the processor. The instructions are configured to receive a code, the code comprising a Uniform Resource Locator (URL) for a process, the process being executable based on a trigger, and the code further comprising parameters to input to the process when the process is triggered. The instructions are configured to decode the code to derive the URL and the parameters from the code. The instructions are configured to trigger execution of the process by parsing the URL. The instructions are configured to input the parameters to the process being executed. The process performs an operation based on the parameters.

In other features, the process is configured to process data across a plurality of services by performing the operation using the parameters when executed based receiving the code.

In other features, the instructions are further configured to provide a status of the operation.

In other features, the instructions are further configured to designate a source from which to receive the code and to restrict the source from accessing resources associated with the process.

In other features, the instructions are further configured to receive the code from a card read by a reader of an access control system controlling access to premises, the code including data identifying a holder of the card. The instructions are further configured to perform the operation on behalf of the holder based on the data.

In other features, the instructions are further configured to send a query to a plurality of mobile devices during execution of the process, the query requesting responses from the plurality of mobile devices, the responses comprising information about the plurality of mobile devices generated without interaction with an entity external to the plurality of mobile devices. The instructions are further configured to receive the responses from the plurality of mobile devices and to provide the responses as an input to the process to perform the operation based on the input.

In other features, the process is configured to process the input, select a mobile device from the plurality of mobile devices based on the processing, and send a message to the selected mobile device from the plurality of mobile devices.

In other features, the instructions are further configured to send the query as a silent push notification. The query wakes up an application on the plurality of mobile devices to collect the information including a state, location, and data about the plurality of mobile devices.

In still other features, a system comprises a processor and a non-transitory computer-readable medium to store instructions for execution by the processor. The instructions are configured to receive an input based on a card read by a reader of an access control system controlling access to a facility, the input comprising identifying information of an entity using the card. The instructions are configured to trigger, in response to receiving the input, a process that performs an operation on behalf of the entity by using the identifying information of the entity from the input, the operation including processing data across a plurality of services using predefined parameters. The operation performed by the process when triggered by the input is separate from operations of the access control system.

In other features, the input is received directly from the reader.

In other features, the input is received from a first service that is associated with the access control system and that is registered with a second service used to create the process.

In other features, the instructions are further configured to provide a status of the operation to the entity.

In other features, the instructions are further configured to designate the reader from which to receive the input.

In other features, the reader is configured to read, and send as the input, an encoded Uniform Resource Locator (URL) including the predefined parameters for the process. The instructions are further configured to decode the encoded URL, parse the decoded URL, and perform the operation based on the parsing.

In other features, the instructions are further configured to send a query to a plurality of mobile devices during execution of the process, the query requesting responses from the plurality of mobile devices, the responses comprising information about the plurality of mobile devices generated without interaction with an entity external to the plurality of mobile devices. The instructions are further configured to receive the responses from the plurality of mobile devices and to provide the responses as the input to the process to perform the operation based on the input.

In other features, the process is configured to process the input, select a mobile device from the plurality of mobile devices based on the processing, and send a message to the selected mobile device from the plurality of mobile devices.

In other features, the instructions are further configured to send the query as a silent push notification. The query wakes up an application on the plurality of mobile devices to collect the information including a state, location, and data about the plurality of mobile devices.

In still other features, a system comprises a processor and a non-transitory computer-readable medium to store instructions for execution by the processor. The instructions are configured to configure a process to perform an operation using predefined parameters, the operation including processing data across a plurality of services. The instructions are configured to condition execution of the process based on receiving an input, the input being based on a card read by a reader of an access control system controlling access to a facility, the input comprising identifying information of an entity using the card. In response to receiving the input, the process performs the operation on behalf of the entity by using the identifying information of the entity from the input. The operation performed by the process is separate from operations of the access control system.

In other features, the input is received directly from the reader.

In other features, the input is received from a first service that is associated with the access control system and that is registered with a second service used to create the process.

In other features, the instructions are further configured to provide a status of the operation to the entity.

In other features, the instructions are further configured to designate the reader from which to receive the input.

In other features, the reader is configured to read, and send as the input, an encoded Uniform Resource Locator (URL) including the predefined parameters for the process. The instructions are further configured to decode the encoded URL, parse the decoded URL, and perform the operation based on the parsing.

In other features, the instructions are further configured to send a query to a plurality of mobile devices during execution of the process, the query requesting responses from the plurality of mobile devices, the responses comprising information about the plurality of mobile devices generated without interaction with an entity external to the plurality of mobile devices. The instructions are further configured to receive the responses from the plurality of mobile devices. The instructions are further configured to provide the responses as the input to the process to perform the operation based on the input.

In other features, the process is configured to process the input, select a mobile device from the plurality of mobile devices based on the processing, and send a message to the selected mobile device from the plurality of mobile devices.

In other features, the instructions are further configured to send the query as a silent push notification. The query wakes up an application on the plurality of mobile devices to collect the information including a state, location, and data about the plurality of mobile devices.

In still other features, a system comprises a processor and a non-transitory computer-readable medium to store instructions for execution by the processor. The instructions are configured to initiate a process in response to receiving a trigger. The process is configured to process data across a plurality of services by performing a predefined operation using predefined parameters when initiated by the trigger. The instructions are configured to send a query to a plurality of mobile devices in response to receiving the trigger, the query requesting responses from the plurality of mobile devices, the responses comprising information about the plurality of mobile devices generated without interaction with an entity external to the plurality of mobile devices. The instructions are configured to receive the responses from the plurality of mobile devices and to provide the responses as an input to the process that performs the predefined operation using the predefined parameters based on the input.

In other features, the process is configured to process the input, select a mobile device from the plurality of mobile devices based on the processing, and send a message to the selected mobile device from the plurality of mobile devices.

In other features, the instructions are further configured to send the query as a silent push notification.

In other features, the query is designed to wake up a mobile application on the plurality of mobile devices to collect the information about the plurality of mobile devices without interaction with an entity external to the plurality of mobile devices.

In other features, the information about the plurality of mobile devices includes a state and location of the plurality of mobile devices and data from the plurality of mobile devices obtained without interaction with an entity external to the plurality of mobile devices.

In other features, the instructions are further configured to designate the plurality of mobile devices from which to receive the input.

In other features, the trigger is received from a reader configured to read, and send as the trigger, an encoded Uniform Resource Locator (URL) including the predefined parameters for the process. The instructions are further configured to decode the encoded URL, parse the decoded URL, and perform the predefined operation based on the parsing.

In other features, the instructions are further configured to receive a code as the trigger from a card read by a reader of an access control system controlling access to premises, the code including data identifying a holder of the card. The instructions are further configured to perform the predefined operation on behalf of the holder based on the data.

The above features and the additional features of the various aspects of the present disclosure described below are not mutually exclusive. Rather, one or more of these features (those mentioned above and those described below) can be combined.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 6A is a functional block diagram of a simplified example of a distributed network system.

FIG. 6B is a functional block diagram of a simplified example of a client device used in the distributed network system of FIG. 6A.

In the drawings, reference numbers may be reused to identify similar and/or identical elements.

DETAILED DESCRIPTION

The present disclosure relates to various aspects of triggering and controlling workflows. Specifically, the various aspects include providing access control for workflows triggered using button sharing, encoding workflows and scanning encoded workflows to trigger workflows, using security badges and access control systems used at workplaces to trigger workflows, and enabling workflows to extract information from mobile devices and using the information for subsequent processing.

The present disclosure is organized as follows. Initially, a brief description of a workflow is presented. Subsequently, the various aspects of the present disclosure are described as follows. A brief description of an aspect is initially presented, which is followed by a detailed description of the aspect. It should be noted that these aspects are described separately for the purpose of clearly describing them. These aspects are not mutually exclusive. One or more aspects can be combined as described below.

Figure 1B:
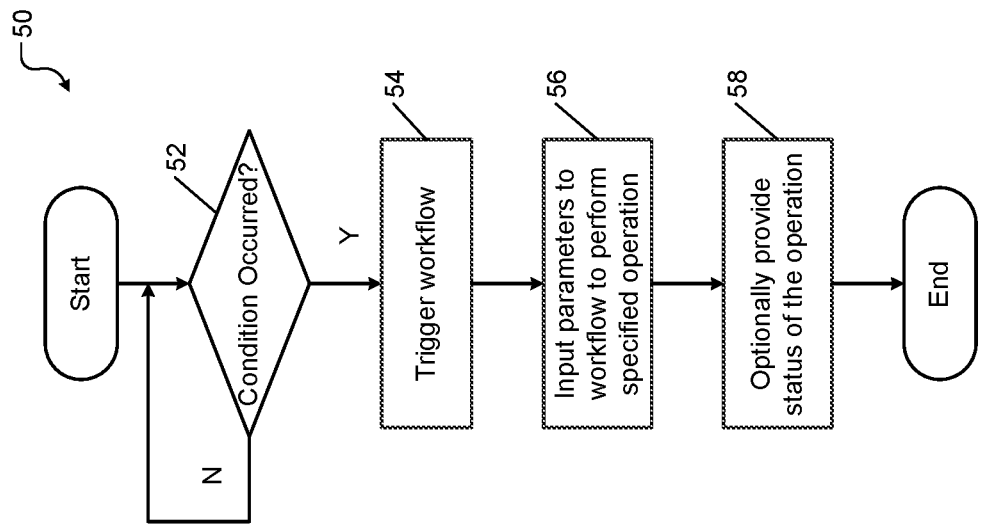
FIG. 1B shows a method performed by the workflow.
Figure 1A:
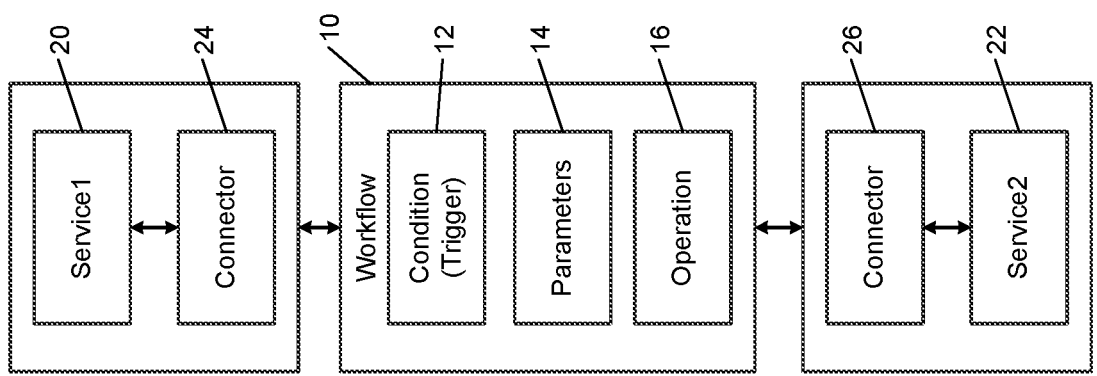
FIG. 1A shows a schematic of a workflow.

Workflow: FIGS. 1A and 1B show a schematic of a workflow that can be created using a flow service. FIG. 1A shows a workflow 10 that can be created using the flow service. The workflow 10 can be configured to execute when a condition (trigger) 12 occurs. When triggered by the occurrence of the condition 12, the workflow 10 runs using parameters 14 as inputs and performs an operation 16. The workflow 10 interacts with two services (or applications) shown as Service1 20 and Service2 22. Generally, the workflow receives the trigger 12, which causes the workflow 10 to execute, from the Service1 20, and performs the operation 16 using the Service2 22. The services 20, 22 use respective connectors 24, 26 to communicate with the workflow 10. One or more of the services 20, 22 and the workflow 10 can be executed on one or more server (e.g., servers shown in FIGS. 6A-6C).

A connector is a proxy or a wrapper around an Application Programming Interface (API) that allows an underlying service to communicate with a flow service. The connector provides a way for users to connect their accounts and leverage a set of pre-built actions and triggers to build their apps and workflows. The connectors enable users to connect apps, data, and devices in the cloud. Each connector offers a set of operations classified as actions and triggers. Once a user connects to the underlying service, these operations can be easily leveraged within apps and workflows. Actions and triggers are briefly described below.

Actions are changes directed by a user. For example, a user would use an action to look up, write, update, or delete data in a SQL database. All actions directly map to operations defined in Swagger (a framework of API developer tools for the OpenAPI Specification (OAS) enabling development across entire API lifecycle).

Connectors also provide triggers that can notify a user's app when specific events occur. Users can build a workflow that listens to a trigger and performs an action whenever the trigger fires. There are two types of triggers. Polling triggers call a service at a specified frequency to check for new data. When new data is available, the trigger causes a new run of a workflow instance with the data as input. Push triggers listen for data on an endpoint. That is, push triggers wait for an event to occur. The occurrence of this event causes a new run of a workflow instance.

FIG. 1B shows a method or process 50 performed by the workflow 10. The method 50 is typically executed by a server running a workflow app. The term control as used herein refers to code that is stored in a storage device associated with the server and that is executed by a processor of the server. A detailed architecture of the server is described below with reference to FIGS. 6A-6C.

At 52, control determines whether a condition that triggers execution of the workflow has occurred. At 54, if the condition that triggers execution of the workflow has occurred, control triggers the workflow. At 56, control inputs predefined parameters to the workflow to perform an operation specified in the workflow. At 58, control optionally provides a status of the operation.

First aspect in brief: A first aspect of the present disclosure relates to providing granular access delegation through button sharing. Following the brief description, the first aspect is described in detail with reference to a system and a method shown in FIGS. 2A and 2B. Buttons and button sharing will be explained in detail in the detailed description of the first aspect. Briefly, in the system and method shown in FIGS. 2A and 2B, a button sharing mechanism for a flow service allows granting run-access to an on-demand workflow. Workflows allow defining specific custom operations such as opening a service ticket with a specific subject. This ability of workflows in effect allows the system and method shown in FIGS. 2A and 2B to perform super-granular and easy-to-use access delegation that was not possible before. Granular access delegation through button sharing performed using the system and method shown in FIGS. 2A and 2B addresses the need to provide an individual or a group with rights to perform a pin-pointed operation without granting wide access to a particular resource. For example, granular access delegation through button sharing performed using the system and method shown in FIGS. 2A and 2B can give an individual or a group a right to add a record with a person's name to a registration list without granting access to view the list or otherwise change the list. An alternative scheme would be to create a dedicated script or software that also manages connections to the software being protected, which is far more costly and less flexible than the proposed granular access delegation solution.

Figure 2B:
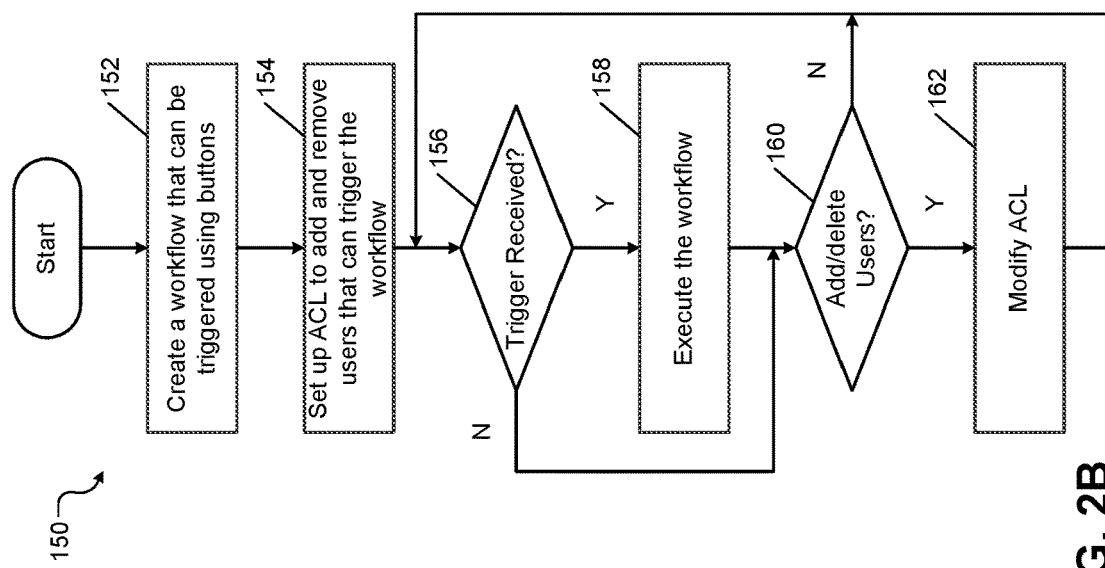
FIG. 2B shows a method for providing granular access delegation through button sharing.
Figure 2A:
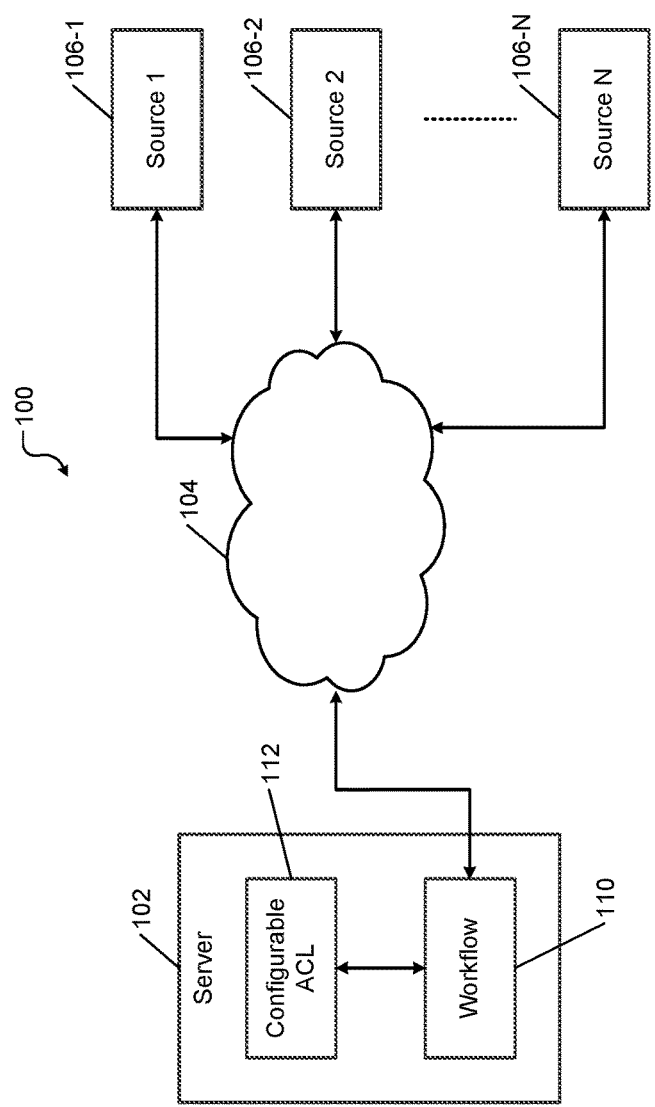
FIG. 2A shows a system for providing granular access delegation through button sharing.

To summarize the first aspect, in a nutshell, in the system and method shown in FIGS. 2A and 2B, for manually triggered workflows, a trigger endpoint is exposed externally (for example as a Representational State Transfer (REST) endpoint). A configurable access control list (ACL) is used to protect the trigger endpoint. The system and method shown in FIGS. 2A and 2B allows a workflow owner or creator to set the ACL and add users and groups to the ACL. However, non-owners are allowed to only view the triggers to which the non-owners have access and to trigger them. That is, the system and method shown in FIGS. 2A and 2B grants the non-owners run-only access to a workflow. The first aspect is now described in detail.

First aspect in detail: The first aspect is now described in detail with reference to FIGS. 2A and 2B, which show a system 100 and a method 150 for providing granular access delegation through button sharing. Buttons and button sharing are described in detail after the detailed description of the first aspect.

FIG. 2A shows the system 100 for providing granular access delegation through button sharing. The system 100 comprises a server 102, a distributed communications system 104, and a plurality of sources 106 (e.g., Source 1 106-1, Source 2 106-2, . . . , and Source N 106-N). The server 102 runs a flow service that allows creating workflows. The detailed architecture of the server 102 is described below with reference to FIGS. 6A-6C. The distributed communications system 104 may include a local area network (LAN), a wide area network (WAN) such as the Internet, or other type of network.

The sources 106 may include mobile devices and/or physical buttons that communicate with the server 102 via the distributed medication system 104. The mobile devices may have an app installed on them that provides buttons on the app or allows physical buttons external to the mobile devices to communicate with the server 102. Alternatively, the physical buttons may have built in internet connectivity and may communicate with the server 102 without utilizing the mobile devices or pairing with an app. For example, the physical buttons with built in internet connectivity can be registered with the flow service as triggering devices available to trigger workflows.

In some implementations, the sources 106 may also include QR code readers described in the second aspect. In some implementations, the sources 106 may also include badge/card readers described in the third aspect. In some implementations, the sources 106 may also include any combination of mobile devices, physical buttons, QR code readers, and badge/card readers.

Throughout the present disclosure, the terms card and badge are used interchangeably and synonymously. The terms card and badge refer to an item people wear on their person at workplaces and swipe the item across or in the vicinity of a reader when attempting to gain access to a particular area of the workplace.

The server 102 may allow a user to create a workflow 110 and a configurable access control list (ACL) 112. The user that creates the workflow 110 and the access control list 112 is the owner of the workflow 110 and the access control list 112. Only the owner can modify the workflow 110 and the access control list 112. The sources 106 are owned by users other than the owner of the workflow 110 and the access control list 112. Accordingly, the sources 106 are not the owners of the workflow 110 and the access control list 112 and therefore cannot modify the workflow 110 and the access control list 112.

The owner sets up the workflow 110 to perform a predefined operation in response to receiving an input (i.e., a trigger) from one or more of the sources 106. The owner creates the access control list 112 that designates the sources 106 that can trigger the workflow 110 and prevents the sources 106 from accessing any other resources associated with the workflow 110. That is, the access control list prevents the sources 106 from performing any operation associated with the workflow 110 other than providing the input (i.e., the trigger) to the workflow 110. Accordingly, the sources 106 can only cause the workflow 110 to run and cannot view or modify other aspects of the workflow 110. The sources 106 also cannot view or modify the access control list 112. Accordingly, the sources 106 cannot add or remove sources to or from the access control list 112. Only the owner can add or remove sources to or from the access control list 112.

Further, only the owner can modify the configuration (i.e., the condition (trigger), the parameters, and the operation) of the workflow 110. For example, only the owner can change what kind of input from the sources 106 may trigger the workflow 110, what kind of parameters to use to perform the operation when the workflow 110 is triggered, what kind of operation to perform when the workflow 110 is triggered, and so on. The sources 106 have no control over any of these modifications to the workflow 110. The workflow 110 performs the predefined operation in response to receiving the input from one of the sources 106 designated in the access control list 112.

FIG. 2B shows the method 150 for providing granular access delegation through button sharing. The term control as used herein refers to code that is stored in a storage device associated with the server 102 and that is executed by a processor of the server 102. The detailed architecture of the server 102 is described below with reference to FIGS. 6A-6C.

At 152, control creates a workflow (e.g., the workflow 110) that can be triggered using buttons (e.g., buttons of an app on a mobile device or physical buttons). At 154, control sets up an access control list (e.g., the access control list 112) that allows adding and removing users (e.g., the sources 106) that can trigger the workflow. At 156, control determines whether a trigger to run the workflow is received from one of the users. At 158, if a trigger to run the workflow is received from one of the users, control executes the workflow. At 160, control determines whether to add or delete users to or from the access control list. At 162, if a user is to be added or removed from the access control list, control modifies the access control list accordingly. Control returns to 156.

Below are simplistic examples of pseudocodes that can be executed by the system 100 and the method 150. Below is a simplistic example of pseudocode for exposing/sharing the trigger.

```
Share_Trigger_Permissions (Manually_Triggered_Flow, Users)
{
        ACL = Manually_Triggered_Flow.
        get_RunPermissionAccessList
// get the access control list for the workflow
        URL = Manually_Triggered_Flow.get_RunLink
// get a url for triggering the workflow
        ACL.AddUsers(Users)
// Add Users to the access control list
        SendInvitationMessage(Users, URL)
// Send an invitation message to Users to trigger the workflow through URL
}
```

Below is a simplistic example of pseudocode for triggering the workflow (server side logic).

```
Trigger_Workflow (Workflow, TriggeringUser)
{
        Authenticate(TriggeringUser)
        ACL = Workflow.get_RunPermissionAccessList
// get the access control list for the workflow
        If (TriggeringUser included in ACL)
        {
                Workflow.RunOnBehalfOf(TriggeringUser)
                Return Success
        }
        Else
        {
                Return Error_Unauthorized
        }
}
```

Buttons and button sharing are now described in detail. Briefly, buttons, both on mobile apps and physical buttons, can be used to trigger workflows. Buttons are an easy way to kick off a workflow from a mobile device with a single tap. To use a button, an app can be downloaded on the mobile device. Alternatively, buttons can also be run from a website hosting the flow service. Further, buttons can be hosted in other types of applications (e.g., desktop applications). Also, if configured to do so, a button triggered by a user can accept user inputs while running, or can send information about the user's location, user's details, current time, and so on. Users can also share their buttons with others to run. This allows anyone to create a button for a specific process and share the button with peers or distribute the buttons to a wider spectrum of users (e.g., sales groups, design teams, and so on) that can also run the buttons.

People can also create shared workflows that can be used by a group or a team to share data and enhance productivity. Further, workflows can also be manually triggered by tapping a button created in a flow app on a mobile device. There are many repetitive tasks that can be run with just a tap of a button. For example, a user may want to quickly email the user's team to remind team members to join the daily team meeting by simply tapping a button created on a flow app on the user's mobile device. Button workflows allow users to accomplish tasks simply by tapping a button on their mobile devices. Users can create button workflows either from their mobile devices or from a portal for the flow service. Creating buttons allows users to easily run repetitive tasks from anyplace at any time via their mobile devices. Executing buttons saves time. Further, since the tasks performed by the buttons are automated, there will be fewer errors than if the tasks are performed manually. Users have full control of their button workflows. The buttons can be enabled, disabled, edited or deleted anytime, anyplace from the mobile app or from the flow service portal (website).

Users can share buttons with or without connections, based on their use cases. Specifically, for connections used in a button workflow, a user sharing a button with others will have two options: provide the user's own connection to be used with the workflow or ask the run-only users to provide their own connections to be used with the workflow. In other words, when a user shares a button, the user can allow persons with whom the user shared the button to use all connections that the button uses. Alternatively, the user can ask the persons with whom the user shares the button to use their own connections. If the user allows others to use the user's connections, the other people cannot access the credentials in the user's connection or reuse them in any other workflow.

Accordingly, when sharing a button with a user's peers, the user may allow the peers to run that button for themselves while using their username and location. If the user later applies any changes to that button, the changes will be seamlessly applied also to those button runs which the peers trigger. The button remains as read-only for the peers. The peers can only trigger the button. The peers are not co-authors and cannot view/modify the button logic, nor can the peers see the user's connection details. All shared buttons run using the connections that the creator of the button used to design the button. However, users with whom a button has been shared can use the shared connections only with that button workflow, and the users cannot access or view the credentials used in these connections.

Button sharing is now described in detail. Typically, a maker (also called creator or owner) of a button can share the button with a consumer (also called a user or a peer). A consumer of the button can share the button with a consumer'. The maker of the button can approve the consumer' to use the button (consumer' converts to consumer at this point).

The maker can perform the following: grant/revoke triggering permissions; approve/deny access to pending triggering permission requests; share: send an invite (giving implicit triggering permissions), copy a link, share a link via app (native phone experience); and manage sharing: list of all buttons shared by self (and all the consumers the buttons are shared with), list of all buttons shared with self, and list of pending requests by consumers'.

A consumer has triggering permissions over a button. A consumer can perform the following: see the maker's buttons shared with him/her; share: copy a link, and share a link via app (native phone experience); and manage sharing: list of all buttons shared with self.

Consumer' is also called indirect consumer and does not have triggering permissions over a button. When a consumer' taps a shared link, the app will open with a page which shows the button and an ask permissions button (unless permissions were already given by the maker). When permissions are granted for the shared button, the indirect consumer will become a consumer.

Scenarios of button sharing are now described. When the maker shares a button by inviting a group of consumers, the maker choses an invite option on a button sharing page and specifies one or more consumers or groups. For each consumer/group in the list, the maker can choose whether to include an invitation email. When the operation is applied, each of the consumers who were specified will be able to see these shared buttons in the app, whether they have received an invitation email or not. This is because the maker's operation granted them triggering permissions implicitly. The invitation email will include a universal link. After the consumer clicks the link, the new shared button will appear on the consumer's app in a 'shared with me' page, where the consumer will be able to add the new button to the consumer's main buttons page.

The maker shares a button by sending a link to a consumer', who does not have the app installed, as follows. The maker sends a universal link to consumer'. Consumer' clicks the link on the consumer's phone, opening the portal, landing on the button page. A banner shows that an app for the flow service can be installed. Alternatively, consumer' is taken to the flow service app in an app store. The consumer installs the flow service app, returns to the link, and clicks the link. This time the app opens on the button page.

Since the maker has not granted triggering permissions on this button to anyone yet, the consumer' can only request access at this point. The consumer' taps the request access button, and the maker receives an email with a link to grant access to the consumer'. The maker can also go to the app and see the pending request in their 'shared by me' buttons list, where the maker can grant/deny access.

Once access has been granted, the consumer' is now a consumer and can use the button from the device of the consumer'. The maker will now see the consumer' as a consumer in the group of users (consumers) with whom the maker shared the button. The consumer', who is now a consumer, can further share this button by sending a link to another consumer', which will start the process again.

Accordingly, triggering permissions allow someone who is not the button owner to run the button's underlying workflow. The workflow will be run using the workflow owner's connections. The button workflow invoker will be available to the workflow owner as an output parameter of the manual trigger. APIs are needed to get permissions for a button, get a list of buttons which are shared with a user, including their owners (ideally grouped by owners), get people's list for an organization, send an email to a maker to request permissions—the email will contain a link for that, and grant triggering permissions for a button (the email link). The connector capabilities needed include ability to get the invoker id/email from the manual trigger connector to allow for action personalization, and to push notification connector should target the push notification to the workflow invoker. A button landing webpage is needed for the shared button (ideally, accessible (but not actionable) without authentication (unless the desired experience is to be directed to the service flow app in the app store)).

In sum, simply stated, a button is a workflow with a manual trigger. The types of permissions that exist for a button include: edit (for owner/co-owner of the button), and run only/trigger (for a user). A user with run only permissions can trigger the workflow with a button and can supply some of the connections for that workflow to run but cannot edit or view the structure of the workflow. Sharing a button with a user means giving that user run only permissions for that manually triggered workflow.

Second aspect in brief: A second aspect of the present disclosure relates to encoding parametrized workflows as a code that can be read or scanned to trigger the workflows. Following the brief description, the second aspect is described in detail with reference to a system and methods shown in FIGS. 3A-3C. For example, using the system and methods shown in FIGS. 3A-3C, workflows may be encoded as a matrix code such as a Quick Response (QR) code, which triggers the workflows when scanned. It should be noted that while QR codes are used throughout the present disclosure for example only, other types of codes may be used as well. Encoding parametrized workflows using the system and methods shown in FIGS. 3A-3C allows attaching actions to objects as explained below. The second aspect implemented using the system and methods shown in FIGS. 3A-3C involves representing a manual trigger for a workflow along with the context associated with the workflow as a code (e.g., a QR code) and using the same in conjunction with shared manual workflow triggers as explained below.

A button workflow is a workflow that is triggered by tapping a button and that can run on demand and receive parameters that will be used within the workflow. Encoding a reference to a button workflow with a list of specific parameters as a code (e.g., a QR code) using the system and methods shown in FIGS. 3A-3C makes it possible to easily attach configurable actions to physical objects.

For example, next to a shelf in a store with a product X, there can be a sticker with a QR code that represents a workflow for ordering more of the product X. Using the system and methods shown in FIGS. 3A-3C, a store employee can scan the QR code with an app that is built to support this feature and through that app order more of the product X to the store. The workflow executed using the system and methods shown in FIGS. 3A-3C can perform actions such as adding an order in an inventory service and notify relevant people about the same. This feature becomes more useful when used with shared manual workflow triggers, which enables a single person to prepare such QR codes for an entire team/organization in the above example.

Objects and locations in real life can often have common operations and workflows that relate to them. For instance, equipment or machinery sometimes needs to be reported as broken, products sometimes need to be reported as short in stock, meeting rooms may need to be booked or checked for availability, and so on. These workflows generally require accessing one or more Software-as-a-Service (SaaS) services, navigating to the right place, filling in the context, and interacting with the services to complete the relevant operations. Performing all of these operations from the relevant physical location (e.g., next to the broken equipment) can often be inconvenient or impractical. With the second aspect, implemented using the system and methods shown in FIGS. 3A-3C, one can simply scan a QR code to execute a full workflow with the right context to perform all of the above operations.

It should be noted that currently manually triggered workflows are not packed into a code such as a QR code. Further, codes such as QR codes are currently used to point to a relevant web page but are not used to perform a full workflow with the right context. Accordingly, the second aspect provides an entirely new functionality and a significant improvement in managing data flow between different applications across servers. Also, this feature becomes more useful when used in conjunction with shared manual workflow triggers.

To summarize, the pre-requisite for the second aspect is to have manually triggered workflows where trigger permissions may be shared. The process includes, using the system and methods shown in FIGS. 3A-3C, enabling encoding a Uniform Resource Location (URL) representing a manually triggered workflow, together with parameters to be passed to the workflow; and enabling scanning the parametrized encoded URL from an app, parsing the same, and triggering the workflow based on the parsing. The second aspect is now described in detail.

Second aspect in detail: The second aspect is now described in detail with reference to FIGS. 3A-3C, which show a system 200 and methods 250 and 280 for encoding a parametrized workflow as a code (e.g., a QR code) that can be read or scanned to trigger the workflow.

Figure 3A:
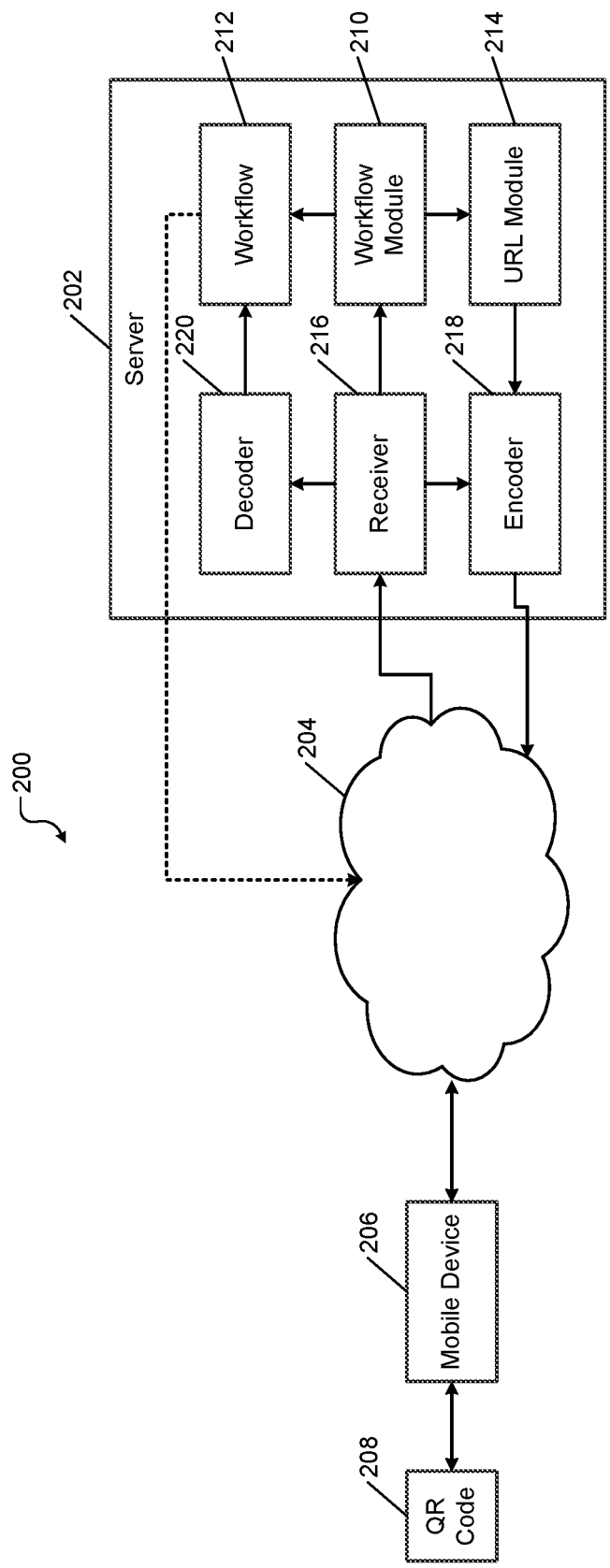
FIG. 3A shows a system for encoding a parametrized workflow as a code that can be scanned to trigger a workflow.

FIG. 3A shows the system 200 comprising a server 202, a distributed communications system 204, a mobile device 206, and a QR code 208. The distributed communications system 204 may include a local area network (LAN), a wide area network (WAN) such as the Internet, or other type of network. The server 202 comprises a workflow module 210 that runs a flow service that generates a workflow 212. The server 202 comprises a URL module 214 that generates a URL for executing the workflow 212. The server 202 also comprises a receiver 216 that can receive a URL and parameters (e.g., from the mobile device 206) to execute a workflow generated elsewhere. The server 202 comprises an encoder 218 that encodes the URL and parameters to be input to the workflow when the workflow is triggered. The encoder 218 generates a code (e.g., the QR code 208). For example, the QR code 208 can be sent to the mobile device 206 (or elsewhere), where the QR code 208 can be printed and arranged next to an object (e.g., an item to be ordered, a machine for which service can be called when the machine goes down, etc.).

The QR code 208 can then be scanned using an app on a mobile device (e.g., the mobile device 206). The mobile device sends the scanned code to a decoder 220 via the distributed communications system 204. The decoder 220 decodes the URL, triggers the execution of the workflow and inputs the parameters to the workflow. While the workflow module 210, the workflow 212, the URL module 214, the encoder 218, and the decoder 220 are shown as components of the same server 202, one or more of these components can be executed on different servers communicating with each other via the distributed communications system 204. In other words, the server 202 can be a cluster of servers. The detailed architecture of the server 202 is described below with reference to FIGS. 6A-6C. In some implementations, the encoding/decoding operations described herein can be performed in an app on a mobile device.

Optionally, the workflow may be configured to return status of the operation performed by the workflow. For example, if the workflow is for ordering an item based on the scanned code, an order status may be returned to an appropriate device (e.g., the mobile device 206 that scanned the code). As another example, if the workflow is for calling service to repair a down machine based on the scanned code, a status of when the service will be performed (e.g., an indication of when a service person will be dispatched or will arrive) may be returned to an appropriate device (e.g., the mobile device 206 that scanned the code).

It should be noted that the second aspect can be combined with the ACL based control described in the first aspect. Specifically, the permission to trigger a workflow can be controlled using ACL as described in the first aspect. For example, only authorized personnel may be allowed order an item or call service. The ordering of the item or calling service can be further specified and controlled using the parameters of the workflow.

Further, the second aspect can be combined with the third aspect if the access control system uses readers and badges equipped with QR codes. In addition, the second aspect can be combined with the fourth aspect, which allows the workflow to query mobile devices and use query responses in subsequent processing. For example, if service for a down machine is requested by scanning a QR code as described in the second aspect, technicians can be searched and dispatched using the querying as described in the fourth aspect.

Figure 3C:
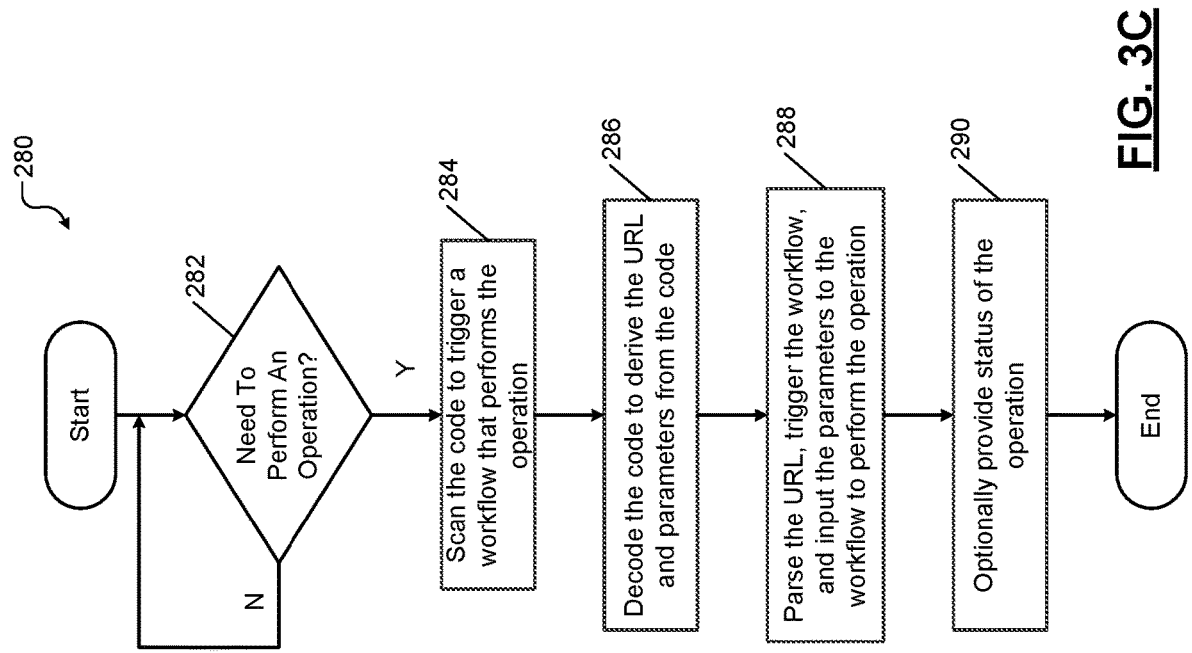
FIG. 3C shows a method for decoding the parametrized workflow and executing the workflow.
Figure 3B:
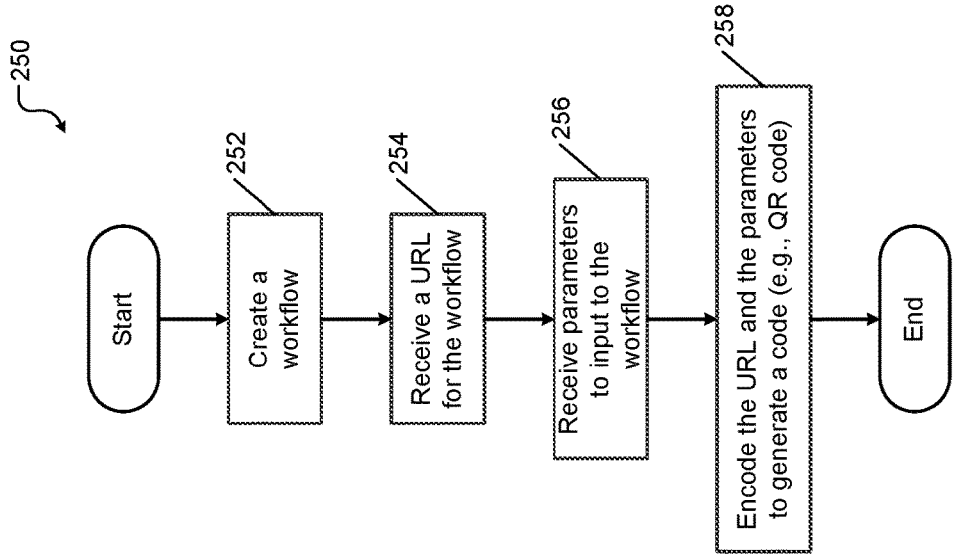
FIG. 3B shows a method for encoding a parametrized workflow as a code that can be scanned to trigger the workflow.

FIG. 3B shows the method 250 for generating an encoded workflow. The term control as used herein refers to code that is stored in a storage device associated with the server 202 and that is executed by a processor of the server 202. The detailed architecture of the server 202 is described below with reference to FIGS. 6A-6C.

At 252, control creates a workflow. At 254, control receives a URL for the workflow. At 256, control receives parameters to input to the workflow. At 258, control encodes the URL and the parameters to generate a code (e.g., a QR code), which when scanned causes the workflow to execute using the parameters.

FIG. 3C shows the method 280 for decoding an encoded URL and parameters for a workflow and executing the workflow. At 282, a user determines whether to perform an operation by scanning a code (e.g., order an item or service). At 284, if an operation by scanning the code needs to be performed, the user scans the code. At 286, control decodes the code to derive the URL and parameters from the code. At 288, control parses the URL, triggers the workflow based on the parsing, and inputs the parameters to the workflow to perform the operation. At 290, control optionally provides a status of the operation (e.g., to the user).

Below are simplistic examples of pseudocodes that can be executed by the system 200 and the methods 250 and 280. The example pseudocodes provided below are for attaching workflows to physical objects thru QR codes. Below is a simplistic example of pseudocode for encoding a URL and parameters for a workflow.

```
WorkflowId = get_WorkflowID
// get identification string/number for the workflow
Parameters = get_Parameters
URL = ConstructUrl(WorkflowId, Parameters)
// construct a URL containing the workflow ID and the parameters
Code = URL.get_QR
// represent the URL as a QR code
```

Below is a simplistic example of pseudocode for decoding an encoded URL and parameters for a workflow.

```
URL = QR.get_URL
// get the URL represented by the QR
WorkflowId = URL.extract_WorkflowID
// extract the workflow id from the url
Parameters = URL.extract_Parameters
// extract the parameters from the url
```

Third aspect in brief: A third aspect of the present disclosure relates to enabling secure on-demand triggering of workflows for users via access control systems. Following the brief description, the third aspect is described in detail with reference to a system and methods shown in FIGS. 4A-4C. As used herein, an access control system (ACS) is a type of security that manages and controls who or what is allowed entrance to a system, environment, or facility. The ACS identifies entities that have access to a controlled device or facility based on the validity of their credentials.

A flow service can enable users to trigger their workflows on demand for a vast variety of use cases. Triggering can be enabled from a flow service website or a mobile app as well as from physical buttons. In the system and methods shown in FIGS. 4A-4C, a new way to trigger workflows while still maintaining user identity is via an ACS used to control access to facilities at workplaces, where access readers can be mapped to specific workflows (with access service to flow service integration). Subsequently, when onsite users swipe their badge or card typically used with the ACS to access different areas of workplace, a workflow would be triggered with their identity and on their behalf using the system and methods shown in FIGS. 4A-4C.

Figure 4A:
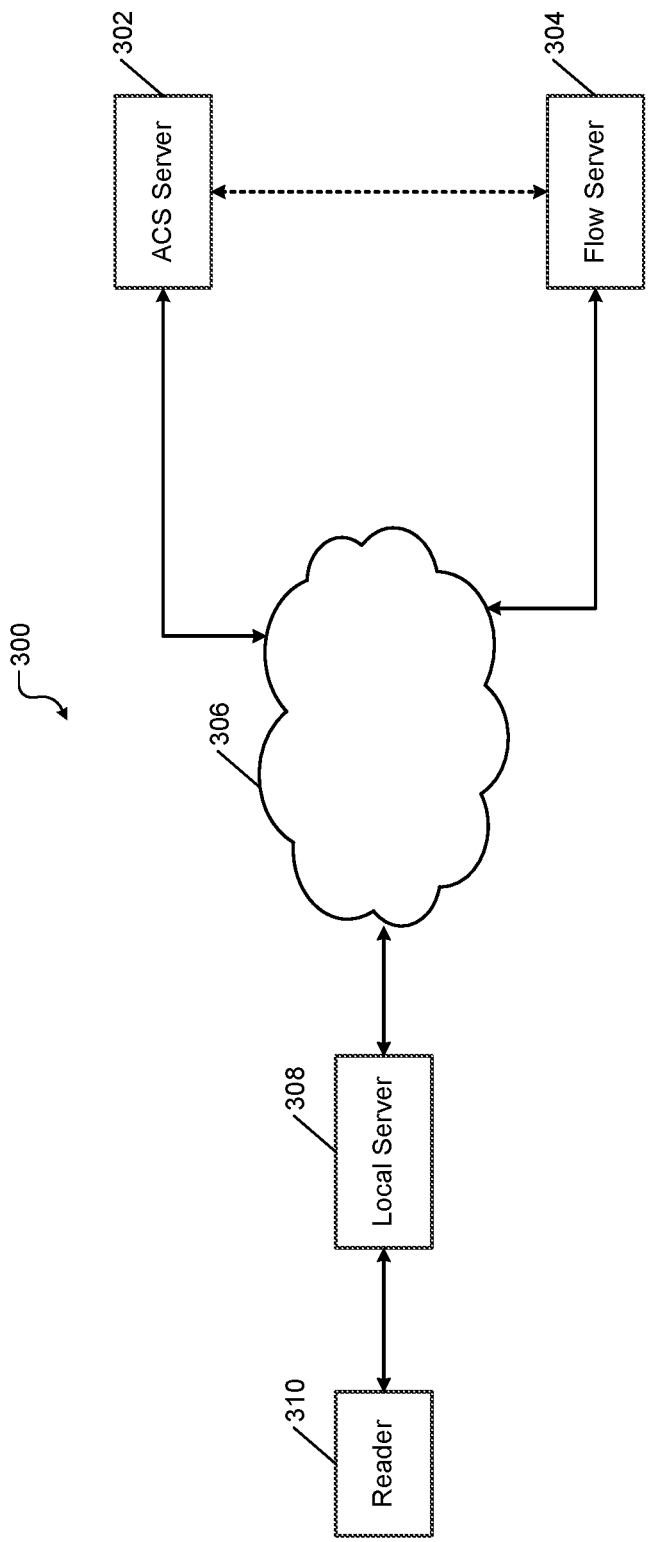
FIG. 4A shows a system for enabling secure on-demand triggering of workflows via access control systems.
Figure 4C:
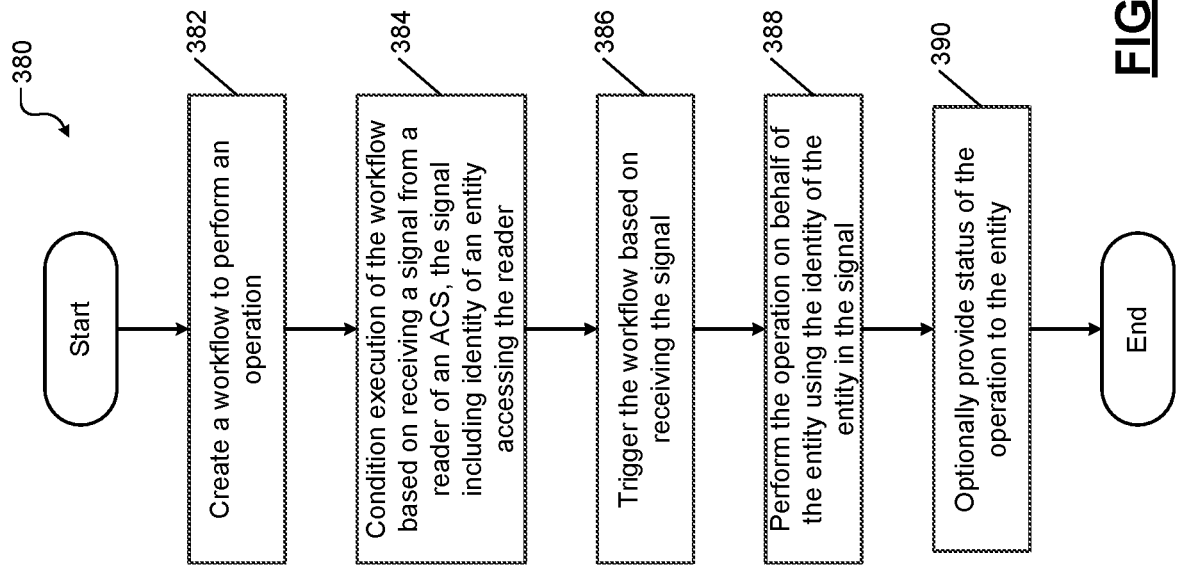
FIG. 4C shows a method for creating a workflow that enables secure on-demand triggering of a workflow via an access control system and executing the workflow based on an input received from the access control system.
Figure 4B:
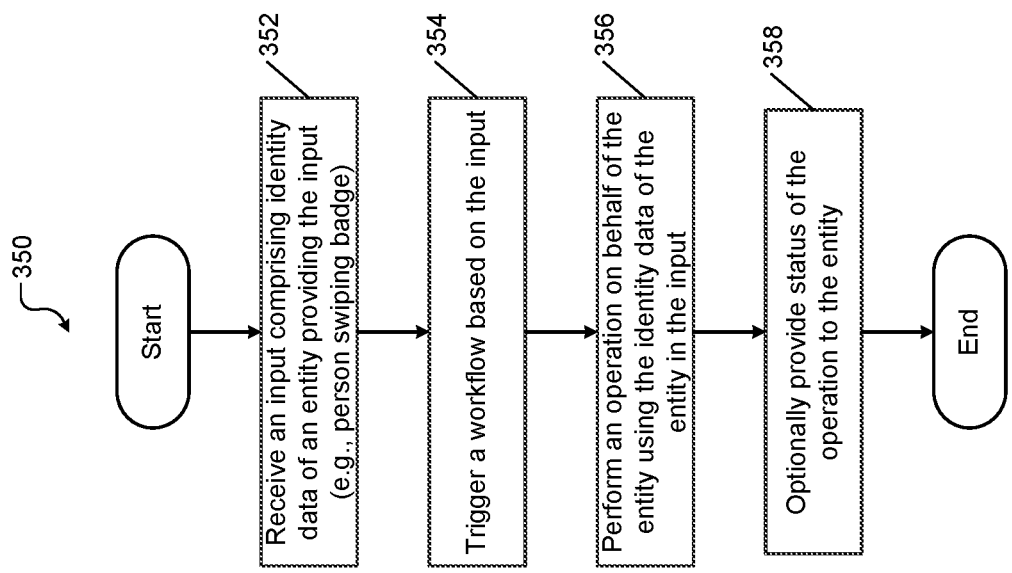
FIG. 4B shows a method for enabling secure on-demand triggering of workflows via access control systems.

For example, in the system and methods shown in FIGS. 4A-4C, the workflow triggered by swiping a badge could perform operations such as, but not limited to, the following: automatic check-in to a conference with a swipe of a badge; registration to a hackathon or training with a swipe of a badge; order shuttle across campus with a swipe of a badge; etc. Accordingly, when using the system and methods shown in FIGS. 4A-4C, there is no need to access any website anymore to perform these operations. Instead, in the system and methods shown in FIGS. 4A-4C, users can just swipe their badge, and the workflow will be triggered on their behalf.

In the system and methods shown in FIGS. 4A-4C, triggering workflows by swiping a badge empowers users and administrators to leverage existing access control systems to perform repetitive business tasks quickly and securely, while maintaining user identity and performing the task on the user's behalf. Combining access control systems (badge readers etc.) and a workflow automation service according to the third aspect results in a new powerful platform comprising the system and methods shown in FIGS. 4A-4C that enables numerous use-cases, for example: check-in to events, registrations to events/trainings, booking rooms/shuttles, and much more.

It should be noted that access control systems have always been leveraged for security and access control and not for customized business automation as accomplished by the third aspect of the present disclosure. Currently, no solution exists that can map these access devices (e.g., badge readers etc.) to customized business workflows. Further, business workflows are currently triggered directly from a workflow product website, a mobile app, and/or physical buttons (physical buttons do not include user identity support while the third aspect does). Accordingly, providing a new channel to securely trigger workflows via access control hardware and service, which is typically used for workplace access and security, is an entirely new solution and a significant advance in managing workflows across applications provided by the system and methods shown in FIGS. 4A-4C.

To summarize the third aspect, in a nutshell, access control systems communicate with their respective cloud service, where all the identity detection and access logic lies. In the system and methods shown in FIGS. 4A-4C, a flow service offers an extensible model via custom API definition (swagger format to represent REST API) and registration (as a connector) in the flow service. The integration is Service to Service: A cloud based service of the access control system is registered as a custom API in the flow service and lists triggers it exposes to invoke workflows and actions it allows (e.g., querying the access control service for details, or automatically updating records/data of the access control service). The main premise of the third aspect is exposing a trigger from a swiped badge within the access control service connector. Using the system and methods shown in FIGS. 4A-4C, administrators can define workflows which are triggered by swiping a badge. In sum, the third aspect implemented using the system and methods shown in FIGS. 4A-4C provides the ability to trigger automation workflows through a new channel: access control systems used to secure access at workplace. The third aspect is now described in detail.

Third aspect in detail: The third aspect is now described in detail with reference to FIGS. 4A-4C, which show a system 300 and methods 350 and 380 for enabling secure on-demand triggering of workflows via access control systems.

FIG. 4A shows the system 300 comprising an ACS server 302, a flow server 304, a distributed communications system 306, a local server 308, and a reader 310. The detailed architecture of the servers 302, 304, 308 is described below with reference to FIGS. 6A-6C. The distributed communications system 306 may include a local area network (LAN), a wide area network (WAN) such as the Internet, or other type of network.

The reader 310 and the local server 308 are located at a facility (e.g., an office building) where access to the facility or sections thereof is controlled by an access control system comprising the reader 310, the local server 308, and the ACS server 302. A user may carry a badge or a card that is swiped proximate to the reader 310. The local server 308 verifies the identity of the user based on the swiped badge and performs authentication to determine whether to allow the user to enter the facility. The ACS server 302 may be located remotely (e.g., in a cloud) relative to the facility comprising the reader 310 and the local server 308. The ACS server 302 may control systems similar to the access control system comprising the reader 310 and the local server 308 located at different facilities.

When a user swipes a badge or a card proximate to the reader 310, the local server 308 receives an input based on the card read by the reader 310. The input comprises identifying information of the user authorized to use the card. The local server 308 sends the input received from the reader 310 to the ACS server 302 as well as the flow server 304.

The flow server 304 runs a flow service using which a workflow is created for use by the users at the facility comprising the reader 310 and the local server 308. For example, the workflow may be designed to check-in people to events, record registrations to events/trainings, book conference rooms/campus shuttles, and so on. The workflow is designed to be triggered in response to receiving the input of a swiped card from the reader 310.

When the input generated by a card swiped at the reader 310 is received at the flow server 304, which includes the identity of the user swiping the card at the reader 310, the input triggers the workflow that performs an operation on behalf of the user by using the identifying information of the user from the input. For example, when the input is received, if the workflow is designed to check-in people to events, record registrations to events/trainings, book conference rooms/campus shuttles, and so on, a corresponding operation is performed on behalf of the user by using the identifying information of the user from the input.

The flow server 304 can receive the input generated by a card swiped at the reader 310 from the local server 308 as described above or from the ACS server 302 as follows. In some implementations, the ACS server 302 may register an ACS service running on the ACS server 302 as a custom API with the flow server 304. The ACS service running on the ACS server 302 controls access of personnel at various facilities comprising systems similar to the reader 310 and the local server 308. Accordingly, the ACS service running on the ACS server 302 has identifying and authentication information for the users using the access control systems at various facilities controlled by the ACS service.

By registering the ACS service as a custom API with the flow server 304, the flow server 304 has access to the identifying and authentication information for the users at these facilities. For example, by registering the ACS service as a custom API with the flow server 304, the flow server 304 can receive from the ACS server 302 a notification each time a user swipes a card at a reader at a facility, where the notification includes the identifying and authentication information for the user. Regardless of the source from which the flow server 304 receives the input generated by a card swiped at the reader 310, the input triggers the workflow that performs an operation on behalf of the user by using the identifying information of the user from the input.

It should be noted that the operation performed by the workflow upon being triggered in response to receiving the input is separate and distinct from the operations typically and routinely performed by the access control system (specifically, granting or denying access to premises). Rather, non-limiting examples of operations that can be performed by the workflow include checking-in people to events, recording registrations to events/trainings, booking conference rooms/campus shuttles, and so on.

FIG. 4B shows the method 350 for enabling secure on-demand triggering of workflows via access control systems. The term control as used herein refers to code that is stored in a storage device associated with the server 304 and that is executed by a processor of the server 304. The detailed architecture of the server 304 is described below with reference to FIGS. 6A-6C.

At 352, control receives an input based on a card read by a reader of an access control system installed at a facility, where the input comprises identifying information of an entity authorized to use the card. Control may receive the input directly from the reader or from a service associated with the access control system and registered with a flow service used to create the workflow.

At 354, control triggers a workflow in response to receiving the input. At 356, control performs an operation on behalf of the entity by using the identifying information of the entity from the input. The operation performed by the workflow upon being triggered in response to receiving the input is separate and distinct from the operations typically and routinely performed by the access control system. At 356, control optionally provides the status of the operation to the entity that swiped the card at the reader.

It should be noted that the third aspect can be combined with the ACL control described in the first aspect. Specifically, the permission to trigger a workflow can be controlled using ACL as described in the first aspect. For example, by using ACL as described in the first aspect, in the third aspect, only relevant personnel, rather than any person swiping the card at the reader 310, may be allowed trigger the associated workflow. Based on the identifying information of the person swiping the card, which is available from the ACS, and based on the parameters specified in the workflow, the workflow can be designed to not trigger unless the person's identity matches a particular criterion.

For example, if the person swiping the card is a guest visiting a company while the workflow is designed to register people for a harvesting or brainstorming session internal to the company to which the guest should not be admitted, the input from the card reader will not trigger the workflow designed to admit people to the session. On the other hand, if a person is scheduled to visit another facility on a campus for a meeting, the card swiped by the person may trigger a workflow designed to order a campus shuttle that can take the person to the facility where the meeting is scheduled. Other use cases are contemplated.

Further, the third aspect can be combined with the second aspect. For example, the card or the badge may include a QR code described in the second aspect. For example, the person possessing the badge may be responsible for ordering an item that is low in stock in a store or for calling service when a machine goes down. In these examples, scanning the badge will trigger the workflows that perform operations that complete the tasks of ordering the item or calling service.

In addition, the third aspect can be combined with the fourth aspect. For example, in the service call example, the service technician can be located, and notifications can be sent to the service technician as well as the person calling service as described in the fourth aspect.

FIG. 4C shows a method 380 for creating a workflow that enables secure on-demand triggering of a workflow via an access control system and executing the workflow based on an input received from the access control system. At 382, control creates a workflow to perform an operation. At 384, control conditions the execution of the workflow based on receiving a signal from a reader of an access control system. The signal includes identifying information of an entity that accesses the reader. At 386, control triggers the workflow based on receiving the signal from the reader. At 388, control performs the operation on behalf of the entity using the identifying information of the entity in the received signal. At 390, control optionally provides status of the operation to the entity.

Below are simplistic examples of pseudocodes that can be executed by the system 300 and the methods 350 and 380. The example pseudocodes provided below are for attaching a workflow to a physical access device and triggering the workflow using the physical access device. Below is a simplistic example of pseudocode that can be executed by logic at the endpoint upon scanning a badge.

```
isValidBadge = Verify scanned badge
if (isValidBadge)
{
        Notify service that badge has been scanned
        Send badge details and scanner identity
}
```

Below is a simplistic example of pseudocode that can be executed by logic on the server side upon a call from scanning a badge.

```
User = get user identity from badge details
Workflow, Parameters = get workflow ID and parameters mapped to
the scanner
If (User has run permissions for Workflow)
{
        Run Workflow with Parameters on behalf of User
}
```

Fourth aspect in brief: A fourth aspect of the present disclosure relates to connecting mobile devices to a workflow service in a way that allows the workflow service to interact with the mobile devices just as the workflow interacts with services that the workflow controls. Following the brief description, the fourth aspect is described in detail with reference to a system and methods shown in FIGS. 5A-5C. Specifically, in the system and methods shown in FIGS. 5A-5C, a workflow engine executing the workflow can query multiple distributed mobile devices regarding their state, location, and data, and can use that information as input in subsequent processing performed by the workflow.

The state and data of mobile phones is often relevant to a workflow. For instance, a user may want different actions to take place depending on whether the user is at work or at home. The fourth aspect implemented using the system and methods shown in FIGS. 5A-5C addresses this issue by letting the workflow query the mobile phones for state or other data and uses that as input for subsequent operations, which can be different depending on the state and data.

For example, suppose a user has a workflow that triggers when a vending machine breaks down and contacts a service technician. Since the workflow implemented using the system and methods shown in FIGS. 5A-5C can interact with mobile devices of technicians, the workflow can identify which technician is nearest to the vending machine and notify that technician.

While a workflow can be currently triggered from a phone (e.g., by tapping a button on a mobile app on the phone) and a workflow can remotely perform actions in a phone (e.g., put the phone on mute or add a contact), currently there is no solution allowing querying distributed user phones from within a workflow and performing subsequent operations using responses to the query. The fourth aspect implemented using the system and methods shown in FIGS. 5A-5C provides such a solution as explained below in detail.

Figure 5A:
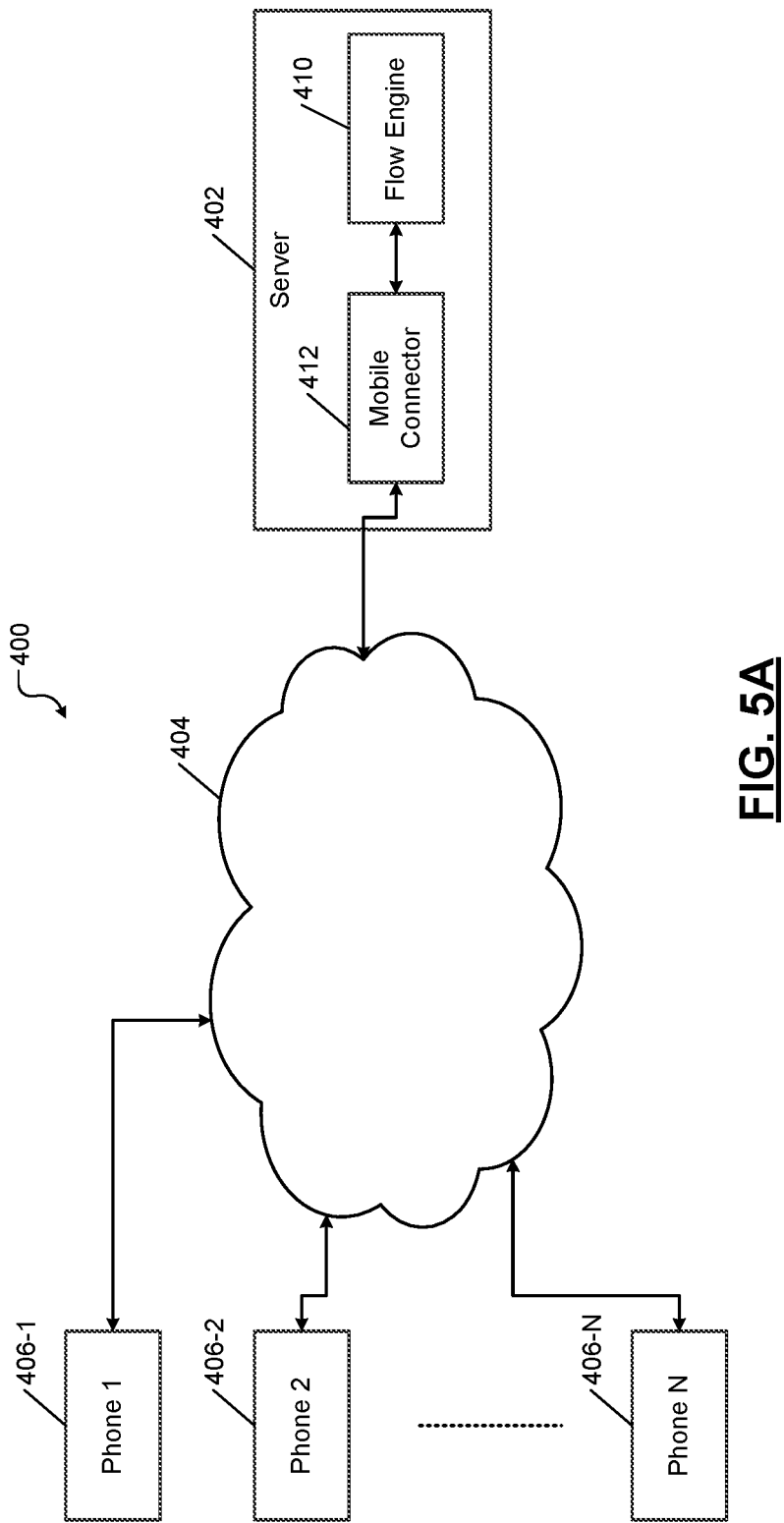
FIG. 5A shows a system for connecting mobile devices to a workflow service to allow the workflow service to interact with the mobile devices.
Figure 5C:
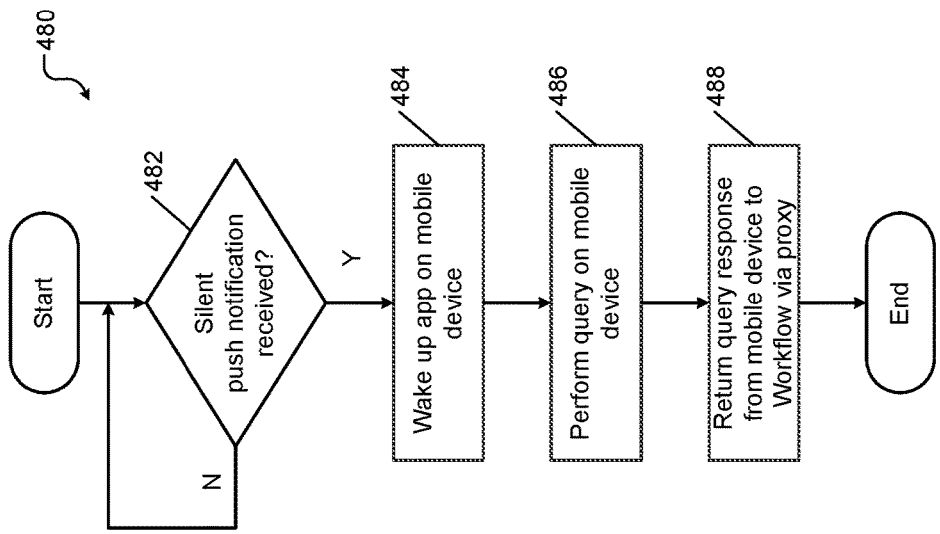
FIG. 5C shows a method for collecting data from mobile devices in response to receiving a silent push notification from a workflow executing on a remote server.
Figure 5B:
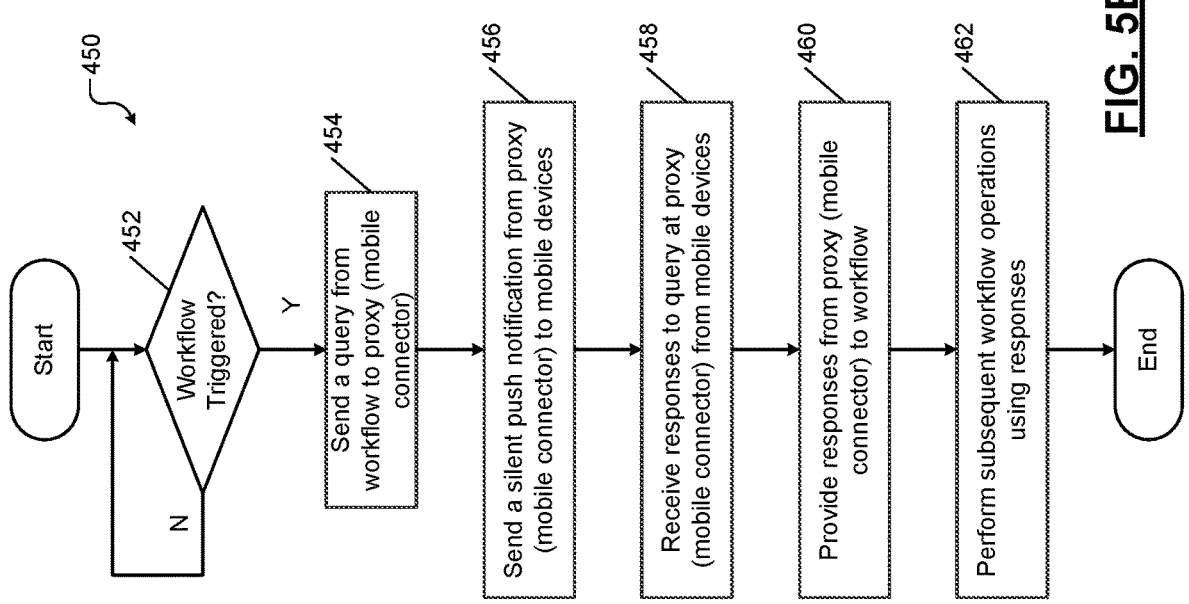
FIG. 5B shows a method for connecting mobile devices to a workflow service to allow the workflow service to interact with the mobile devices.

To summarize the fourth aspect, in a nutshell, in the system and methods shown in FIGS. 5A-5C, a mobile connector, which is a server side entity, serves as a proxy between mobile phones and the workflow engine. In a mobile-query step of the workflow, the workflow sends a query to the proxy, and the proxy sends a silent push notification to relevant mobile devices. The mobile devices have an app that wakes up due to the notification, performs the query, and sends the response back to the proxy. The proxy responds to the workflow engine with the query result. The workflow engine uses the query result in subsequent operations of the workflow. In sum, the fourth aspect implemented using the system and methods shown in FIGS. 5A-5C provides the ability to query multiple mobile phones from within a workflow and performing actions using responses, the ability to connect with multiple users rather than just the owner of the workflow, and leveraging silent push notifications for efficiently implementing these features. The fourth aspect is now described in detail.

Fourth aspect in detail: The fourth aspect is now described in detail with reference to FIGS. 5A-5C, which show a system 400 and methods 450 and 480 for connecting mobile devices to a workflow service in a way that allows the workflow service to interact with the mobile devices.

FIG. 5A shows the system 400 comprising a server 402, a distributed communications system 404, and a plurality of mobile devices (e.g., phones) 406 (e.g., Phone 1 406-1, Phone 2 406-2, . . . , and Phone N 406-N). The detailed architecture of the server 402 is described below with reference to FIGS. 6A-6C. The distributed communications system 404 may include a local area network (LAN), a wide area network (WAN) such as the Internet, or other type of network.

The server 402 comprises a workflow engine 410 running a flow service that generates workflows. The server 402 comprises a mobile connector 412 that serves as a proxy between the phones 406 and the workflow engine 410. The workflow engine 410 may generate a workflow designed to be executed in response to receiving a trigger. When triggered, the workflow executes and sends a query to the plurality of mobile devices 406. The query is sent by the mobile connector 412, which acts as a proxy between the mobile devices 406 and the workflow engine 410. Specifically, the workflow sends the query to the mobile connector 412, and the mobile connector 412 sends a silent push notification to relevant mobile devices 406. The query requests responses from the mobile devices 406. The responses can comprise information about the mobile devices 406. For example, the information can include the state, location, and other data about the mobile devices 406.

The mobile devices 406 generate the responses without interacting with an entity external to the plurality of mobile devices 406 (i.e., without user interaction, due to the silent push notification, which does not alert the user and is transparent to the user). For example, on receiving the silent push notification, an app installed on the mobile devices 406 wakes up, performs the query, collects the data necessary to respond to the query, and sends the response to the mobile connector 412. The mobile connector 412 provides the response as an input to the workflow that performs an operation based on the input. The workflow processes the input and performs subsequent operations based on the input. Optionally, the workflow selects a mobile device from the plurality of mobile devices 406 based on the processing of the input and sends a message to the selected mobile device.

For example, the workflow may be triggered by a service call initiated by pushing a button as described in the first aspect, by scanning a code as described in the second aspect, or by swiping a badge as described in the third aspect. The query may include a silent push notification sent to the mobile devices belonging to multiple service personnel. The responses received from the mobile devices may include the location information of the service personnel. Other data or state from one of the mobile devices (e.g., a do not disturb setting) may indicate that the particular service person is unavailable or busy. The location information may assist in locating a nearest service person available to perform the requested service. The message sent to the nearest service person may ask the service person to respond and handle the requested service.

FIG. 5B shows the method 450 for connecting mobile devices to a workflow service in a way that allows the workflow service to interact with the mobile devices. The term control as used herein refers to code that is stored in a storage device associated with the server 402 and that is executed by a processor of the server 402. The detailed architecture of the server 402 is described below with reference to FIGS. 6A-6C.

At 452, control determines whether a workflow is triggered. At 454, if the workflow is triggered, control sends a query from the workflow to a mobile connector that acts as a proxy between a workflow engine executing the workflow and a plurality of mobile devices. At 456, control sends a silent push notification from the mobile connector to the mobile devices. At 458, control receives responses to the query from the mobile devices. At 460, control provides the responses to the workflow engine. At 462, control performs subsequent workflow operations using the received responses as inputs. For example, the subsequent workflow operations may include selecting one of the mobile devices and assigning a task to the selected mobile device according to the configuration of the workflow.

FIG. 5C shows the method 480 for collecting data from mobile devices in response to receiving a silent push notification from a workflow executing on a remote server using an app installed on the mobile devices and sending the data to the workflow. At 482, control determines whether a query in the form of a silent push notification is received at a mobile device from a workflow executing on a remote server. At 484, control wakes up the app on the mobile device in response to receiving the silent push notification at the mobile device. At 486, the app on the mobile device performs the query and collects requested information from the mobile device without any interaction with an external entity associated with the mobile device. At 488, control returns the collected information as a response to the query to the workflow via proxy, which uses the response as an input for subsequent operations. For example, the subsequent workflow operations may include selecting one of the mobile devices and assigning a task to the selected mobile device according to the configuration of the workflow.

Below are simplistic examples of pseudocodes that can be executed by the system 400 and the methods 450 and 480. The example pseudocodes provided below are for querying mobile devices as part of a workflow. Below is a simplistic example of pseudocode that can be executed by the server side logic.

```
QueryMobileDevices(Devices, Workflow, Query)
{
        For each (Device in Devices)
        {
                SendQueryNotification(Device, Query)
        }
        Responses = WaitForResponses(Devices)
        Return Responses
}
```

Below is a simplistic example of pseudocode that can be executed by the mobile device logic.

```
HandleQueryRequest(Workflow, Query)
// silent push notification handler
{
        Response = Perform Query
        Send Response to workflow service
}
```

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

FIG. 6A shows a simplified example of a distributed computing system 500. The distributed computing system 500 includes a distributed communications system 510, one or more client devices 520-1, 520-2, . . . , and 520-M (collectively, client devices 520), and one or more servers 530-1, 530-2, . . . , and 530-N (collectively, servers 530). M and N are integers greater than or equal to one. The distributed communications system 510 may include a local area network (LAN), a wide area network (WAN) such as the Internet, or other type of network. The client devices 520 and the servers 530 may be located at different geographical locations and communicate with each other via the distributed communications system 510. The client devices 520 and the servers 530 connect to the distributed communications system 510 using wireless and/or wired connections.

The client devices 520 may include smartphones, personal digital assistants (PDAs), tablets, laptop computers, personal computers (PCs), etc. Additionally, the client devices 520 may include the physical buttons and the readers of the present disclosure. The servers 530 may provide multiple services to the client devices 520. For example, the servers 530 may execute software applications developed by one or more vendors. The server 530 may host multiple databases that are relied on by the software applications in providing services to users of the client devices 520. The servers 530 may include all the servers of the present disclosure.

In some examples, one or more servers 530 may execute one or more services of the present disclosure. Further, one or more servers 530 and one or more clients may implement one or more methods and one or more systems (or portions thereof) of the present disclosure.

FIG. 6B shows a simplified example of the client device 520-1. The client device 520-1 may typically include a central processing unit (CPU) or processor 550, one or more input devices 552 (e.g., a keypad, touchpad, mouse, touchscreen, etc.), a display subsystem 554 including a display 556, a network interface 558, memory 560, and bulk storage 562. The physical buttons and readers of the present disclosure may not include some of these components.

The network interface 558 connects the client device 520-1 to the distributed computing system 500 via the distributed communications system 510. For example, the network interface 558 may include a wired interface (for example, an Ethernet interface) and/or a wireless interface (for example, a Wi-Fi, Bluetooth, near field communication (NFC), or other wireless interface). The memory 560 may include volatile or nonvolatile memory, cache, or other type of memory. The bulk storage 562 may include flash memory, a magnetic hard disk drive (HDD), and other bulk storage devices.

The processor 550 of the client device 520-1 may execute an operating system (OS) 564 and one or more client applications 566. The client applications 566 may include an application that accesses the servers 530 via the distributed communications system 510. The client applications 566 may implement one or more methods (or portions thereof) of the present disclosure.

Figure 6C:
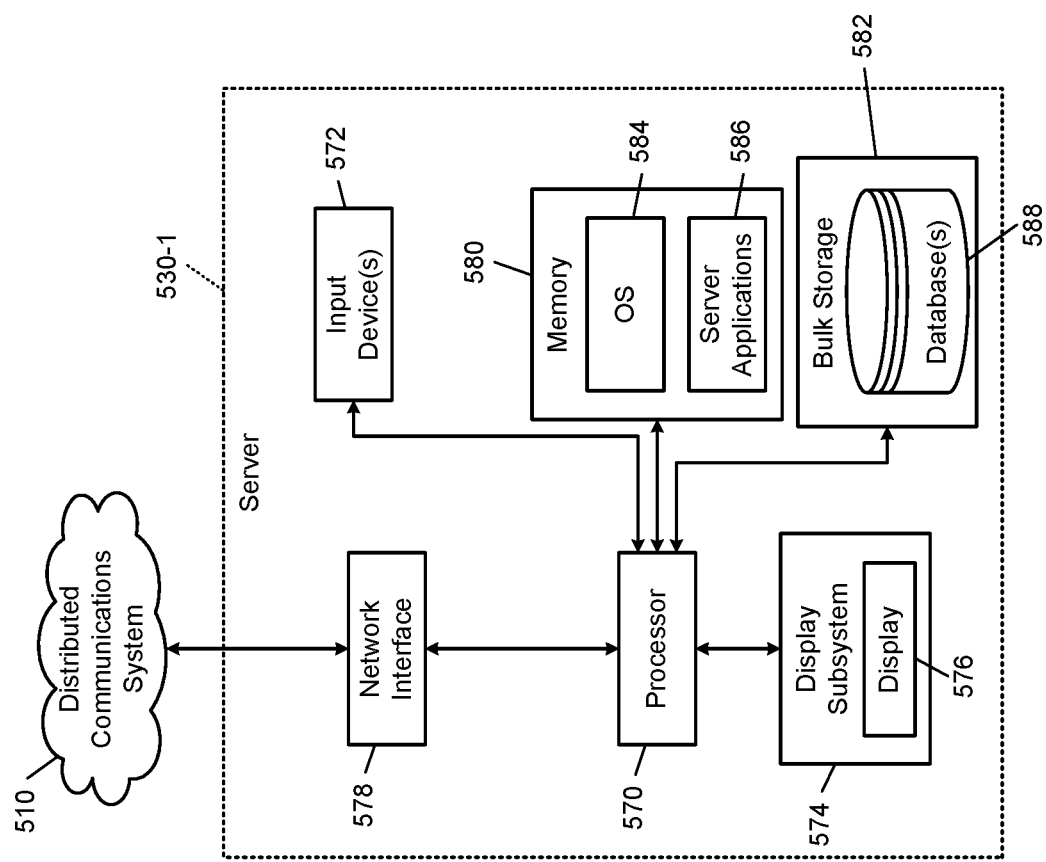
FIG. 6C is a functional block diagram of a simplified example of a server used in the distributed network system of FIG. 6A.

FIG. 6C shows a simplified example of the server 530-1. The server 530-1 typically includes one or more CPUs or processors 570, a network interface 578, memory 580, and bulk storage 582. In some implementations, the server 530-1 may be a general-purpose server and include one or more input devices 572 (e.g., a keypad, touchpad, mouse, and so on) and a display subsystem 574 including a display 576.

The network interface 578 connects the server 530-1 to the distributed communications system 510. For example, the network interface 578 may include a wired interface (e.g., an Ethernet interface) and/or a wireless interface (e.g., a Wi-Fi, Bluetooth, near field communication (NFC), or other wireless interface). The memory 580 may include volatile or nonvolatile memory, cache, or other type of memory. The bulk storage 582 may include flash memory, one or more magnetic hard disk drives (HDDs), or other bulk storage devices.

The processor 570 of the server 530-1 executes an operating system (OS) 584 and one or more server applications 586, which may be housed in a virtual machine hypervisor or containerized architecture. The bulk storage 582 may store one or more databases 588 that store data structures used by the server applications 586 to perform respective functions. The server applications 586 may implement one or more methods (or portions thereof) of the present disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A system comprising:
a processor; and
one or more hardware storage devices having stored executable instructions that are executable by the processor to configure the system to do the following:
generate a process to perform a predefined operation in response to receiving a predefined input, wherein the process is configured to process data across a plurality of services by performing the predefined operation using predefined parameters when triggered by the predefined input;
provision the process with an ability to designate one or more sources to provide the predefined input and to prevent the one or more sources from accessing the process for a purpose other than providing the predefined input; and
perform the predefined operation in response to receiving the predefined input from one of the designated sources,
wherein the ability to designate one or more sources to provide the predefined input and to prevent the one or more sources from accessing the process for a purpose other than providing the predefined input allows restricting the one or more sources from accessing resources associated with the process, and
wherein the one or more sources include a reader configured to read, and send as the predefined input, data from a card used with an access control system controlling access to premises, the data identifying a holder of the card; and wherein the instructions are further configured to perform the predefined operation on behalf of the holder based on the data.

2. The system of claim 1 wherein the one or more sources include mobile devices, wherein the instructions are further configured to provision the mobile devices with a feature to send the predefined input, and wherein the feature is shared across the mobile devices.

3. The system of claim 1 wherein the one or more sources include physical input devices with built in internet connectivity, wherein the instructions are further configured to provision the physical input devices with a feature allowing the physical input devices to send the predefined input.

4. The system of claim 1 wherein the one or more sources include mobile devices and physical input devices externally associated with the mobile devices, wherein the instructions are configured to provision the mobile devices with a feature allowing the physical input devices to send the predefined input, and wherein the feature is shared across the mobile devices.

5. The system of claim 1 wherein the one or more sources include a reader configured to read, and send as the predefined input, an encoded Uniform Resource Locator (URL) including the predefined parameters for the process; and wherein the instructions are further configured to decode the encoded URL, parse the decoded URL, and perform the predefined operation based on the parsing.

6. The system of claim 1 wherein the instructions are further configured to provision the process with abilities to add a source to provide the predefined input and to remove a source from the designated one or more sources.

7. The system of claim 1 wherein the instructions are further configured to allow a modification of at least one of the predefined operation and the predefined parameters, wherein the one or more sources do not control the modifications.

8. The system of claim 1 wherein the ability to designate one or more sources includes an access control list.

9. The system of claim 1 wherein the process is configured to communicate with the plurality of services, a first service of the plurality of services providing the predefined input, and a second service of the plurality of services performing the predefined operation.

10. A system comprising:
a processor; and
one or more hardware storage devices having stored executable instructions that are executable by the processor to configure the system to do the following:
set up a process configured to communicate with a plurality of services via proxies associated with Application Programming Interfaces of the plurality of services, and to process data across the plurality of services by performing a predefined operation using predefined parameters in response to receiving a predefined input;
designate one or more sources to provide the predefined input to the process;
perform the predefined operation by executing the process in response to receiving the predefined input from one of the designated sources; and
prevent the one or more sources from performing other operations associated with the process to restrict the one or more sources from accessing resources associated with the process, and
wherein the one or more sources include a reader configured to read, and send as the predefined input, data from a card used with an access control system controlling access to premises, the data identifying a holder of the card; and wherein the instructions are further configured to perform the predefined operation on behalf of the holder based on the data.

11. The system of claim 10 wherein the one or more sources include mobile devices, wherein the instructions are further configured to provision the mobile devices with a feature to send the predefined input to the process, and wherein the feature is shared across the mobile devices.

12. The system of claim 10 wherein the one or more sources include physical input devices, wherein the instructions are further configured to provision the physical input devices with a feature allowing the physical input devices to send the predefined input to the process.

13. The system of claim 10 wherein the one or more sources include mobile devices and physical input devices externally associated with the mobile devices, wherein the instructions are configured to provision the mobile devices with a feature allowing the physical input devices to send the predefined input to the process via respective mobile devices, and wherein the feature is shared across the mobile devices.

14. The system of claim 10 wherein the one or more sources include a reader configured to read, and send as the predefined input to the process, an encoded Uniform Resource Locator (URL) including the predefined parameters for the process; and wherein the instructions are further configured to decode the encoded URL, parse the decoded URL, and perform the predefined operation based on the parsing.

15. The system of claim 10 wherein the instructions are further configured to provision the process with an access control list to add a source to provide the predefined input and to remove a source from the designated one or more sources.

16. The system of claim 10 wherein the instructions are further configured to modify at least one of the predefined operation and the predefined parameters and to not grant rights to the one or more sources to modify at least one of the predefined operation and the predefined parameters.

17. A method comprising:
configuring a process to communicate with a plurality of services via proxies associated with Application Programming Interfaces of the plurality of services;
configuring the process to receive a predefined input;
configuring the process to perform a predefined operation in response to receiving the predefined input;
configuring predefined parameters to input to the process in response to receiving the predefined input;
configuring the process to process data across the plurality of services by performing the predefined operation using the predefined parameters in response to receiving the predefined input;
configuring an access control list to designate one or more sources to provide the predefined input to the process using a feature shared across the one or more sources, wherein the one or more sources include mobile devices, physical input devices configured to communicate with the process, or physical input devices external to and associated with the mobile devices, the one or more sources including a reader configured to read, and send as the predefined input to the process, data from a card used to access a facility via an access control system controlling access to facility, the data including an identity of an entity presenting the card to the reader;
configuring the access control list to prevent the one or more sources from performing other operations associated with the process;
executing the process in response to receiving the predefined input from one of the designated sources, including the data from the card; and
performing the predefined operation using the predefined parameters in response to receiving the predefined input from one of the designated sources, by at least performing the predefined operation on behalf of the entity by using the data from the card.

18. The method of claim 17 wherein:
the one or more sources also including a reader configured to read, and send as the predefined input to the process, an encoded Uniform Resource Locator (URL) including the predefined parameters for the process; and
the method further comprising decoding the encoded URL, parsing the decoded URL, and performing the predefined operation based on the parsing.

* * * * *